US012512035B2

(12) United States Patent
Boyce

(10) Patent No.: US 12,512,035 B2
(45) Date of Patent: Dec. 30, 2025

(54) MODULATING A CENTER ALIGNED PWM PULSE APPLYING TRAILING DITHER

(71) Applicant: Snap Inc., Santa Monica, CA (US)

(72) Inventor: Aaron L. Boyce, Camas, WA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 18/960,144

(22) Filed: Nov. 26, 2024

(65) Prior Publication Data

US 2025/0174169 A1 May 29, 2025

Related U.S. Application Data

(60) Provisional application No. 63/603,546, filed on Nov. 28, 2023.

(51) Int. Cl.
*G09G 3/20* (2006.01)
*G09G 3/36* (2006.01)

(52) U.S. Cl.
CPC ......... *G09G 3/2051* (2013.01); *G09G 3/2014* (2013.01); *G09G 3/3607* (2013.01); *G09G 2320/0276* (2013.01)

(58) Field of Classification Search
None
See application file for complete search history.

(56) References Cited

U.S. PATENT DOCUMENTS

| | | | | |
|---|---|---|---|---|
| 6,052,112 | A | 4/2000 | Tanaka et al. | |
| 2008/0266331 | A1* | 10/2008 | Chen | G09G 3/3611 345/690 |
| 2012/0306942 | A1* | 12/2012 | Fujiwara | H05B 45/10 345/690 |
| 2018/0053467 | A1 | 2/2018 | Lee et al. | |
| 2018/0197454 | A1* | 7/2018 | Furihata | G09G 3/20 |
| 2023/0206813 | A1* | 6/2023 | Kang | G09G 3/2007 318/685 |
| 2023/0230550 | A1* | 7/2023 | Byun | G09G 3/3291 345/204 |

OTHER PUBLICATIONS

"International Application Serial No. PCT/US2024/057407, International Search Report mailed Feb. 14, 2025", 3 pgs.
"International Application Serial No. PCT/US2024/057407, Written Opinion mailed Feb. 14, 2025", 7 pgs.

* cited by examiner

*Primary Examiner* — Matthew Yeung
(74) *Attorney, Agent, or Firm* — Schwegman Lundberg & Woessner, P.A.

(57) ABSTRACT

A method and system for controlling a pixel of a display using pulse width modulation (PWM). A desired grayscale value for the pixel is processed to generate a binary encoding having a plurality of select bits encoding a select value, and a dither bit encoding a dither value, encoded by a scheme in which a first select value and a first dither value indicate a center-aligned pulse of a first width having a leading edge at a first temporal position, a second select value and the first dither value indicates a center-aligned pulse of a second width having a leading edge at a second temporal position, and the first select value and a second dither value indicate a center-aligned pulse of a second width having a leading edge at the first temporal position. The binary encoding is provided to the display for pulse width modulation of the pixel.

20 Claims, 15 Drawing Sheets

Modulation Event enable function (LUT) - Center Aligned, Leading and Trailing Dither (prior art)
(all but the last event start a segment)

| Base Grayscale | Dither | Event # 1 | Event # 2 | Event # 3 | Event # 4 | Event # 5 | Event # 6 | Event # 7 | Event # 8 | Event # [illegible] |
|---|---|---|---|---|---|---|---|---|---|---|
| 0 | 0 | 0 | 0 | 0 | 0 | 0 | 0 | 0 | 0 | 0 |
| 0 | 1 | 0 | 0 | 0 | 1 | 0 | 0 | 0 | 0 | 0 |
| 1 | 0 | 0 | 0 | 0 | 1 | 0 | 0 | 0 | 0 | 0 |
| 1 | 1 | 0 | 0 | 1 | 1 | 0 | 0 | 0 | 0 | 0 |
| 2 | 0 | 0 | 0 | 1 | 1 | 0 | 0 | 0 | 0 | 0 |
| 2 | 1 | 0 | 0 | 1 | 1 | 1 | 0 | 0 | 0 | 0 |
| 3 | 0 | 0 | 0 | 1 | 1 | 1 | 0 | 0 | 0 | 0 |
| 3 | 1 | 0 | 1 | 1 | 1 | 1 | 0 | 0 | 0 | 0 |
| 4 | 0 | 0 | 1 | 1 | 1 | 1 | 0 | 0 | 0 | 0 |
| 4 | 1 | 0 | 1 | 1 | 1 | 1 | 1 | 0 | 0 | 0 |
| 5 | 0 | 0 | 1 | 1 | 1 | 1 | 1 | 0 | 0 | 0 |
| 5 | 1 | 1 | 1 | 1 | 1 | 1 | 1 | 0 | 0 | 0 |
| 6 | 0 | 1 | 1 | 1 | 1 | 1 | 1 | 0 | 0 | 0 |
| 6 | 1 | 1 | 1 | 1 | 1 | 1 | 1 | 1 | 0 | 0 |
| 7 | 0 | 1 | 1 | 1 | 1 | 1 | 1 | 1 | 0 | 0 |
| 7 | 1 | 1 | 1 | 1 | 1 | 1 | 1 | 1 | 0 | 0 |

1300

Modulation Event enable function (LUT) - Center Aligned Trailing Dither case 3 (C4 of 8)
(all but the last event start a segment)

| Base Grayscale | Dither | Event # 1 | Event # 2 | Event # 3 | Event # 4 | Event # 5 | Event # 6 | Event # 7 | Event # 8 | Event # 9 |
|---|---|---|---|---|---|---|---|---|---|---|
| 0 | 0 | 0 | 0 | 0 | 0 | 0 | 0 | 0 | 0 | 0 |
| 0 | 1 | 0 | 0 | 0 | 1 | 0 | 0 | 0 | 0 | 0 |
| 1 | 0 | 0 | 0 | 0 | 1 | 0 | 0 | 0 | 0 | 0 |
| 1 | 1 | 0 | 0 | 0 | 1 | 1 | 0 | 0 | 0 | 0 |
| 2 | 0 | 0 | 0 | 1 | 1 | 0 | 0 | 0 | 0 | 0 |
| 2 | 1 | 0 | 0 | 1 | 1 | 1 | 0 | 0 | 0 | 0 |
| 3 | 0 | 0 | 0 | 1 | 1 | 1 | 0 | 0 | 0 | 0 |
| 3 | 1 | 0 | 0 | 1 | 1 | 1 | 1 | 0 | 0 | 0 |
| 4 | 0 | 0 | 1 | 1 | 1 | 1 | 0 | 0 | 0 | 0 |
| 4 | 1 | 0 | 1 | 1 | 1 | 1 | 1 | 0 | 0 | 0 |
| 5 | 0 | 0 | 1 | 1 | 1 | 1 | 1 | 0 | 0 | 0 |
| 5 | 1 | 0 | 1 | 1 | 1 | 1 | 1 | 1 | 0 | 0 |
| 6 | 0 | 1 | 1 | 1 | 1 | 1 | 1 | 0 | 0 | 0 |
| 6 | 1 | 1 | 1 | 1 | 1 | 1 | 1 | 1 | 0 | 0 |
| 7 | 0 | 1 | 1 | 1 | 1 | 1 | 1 | 1 | 0 | 0 |
| 7 | 1 | 1 | 1 | 1 | 1 | 1 | 1 | 1 | 1 | 0 |

1302 1302 1302 1302 1302 1302 1302 1302

FIG. 13

MODULATING A CENTER ALIGNED PWM PULSE APPLYING TRAILING DITHER

CROSS-REFERENCE TO RELATED APPLICATION

This patent application claims the benefit of U.S. Provisional Patent Application No. 63/603,546, filed Nov. 28, 2023, which is incorporated by reference herein in its entirety.

TECHNICAL FIELD

The present disclosure relates generally to liquid crystal display controls and more particularly to controls for pulse width modulated digital drive displays.

BACKGROUND

Some electronic displays, such as liquid crystal (LC) displays (including liquid crystal on silicon (LCoS) displays), may be driven by applying a pulse width modulation (PWM) signal to each pixel of the display to an active or inactive state (binary digital drive). In such a display, a PWM signal consisting of a sequence of voltage pulses (each defined by a voltage level and a duration or width) controls light emitted from the corresponding pixel of the display.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some non-limiting examples are illustrated in the figures of the accompanying drawings in which:

FIG. 13 illustrates an encoding of the center aligned pulse signal patterns of FIG. 6 into a LUT function array, according to some examples.

DETAILED DESCRIPTION

Figure 1:
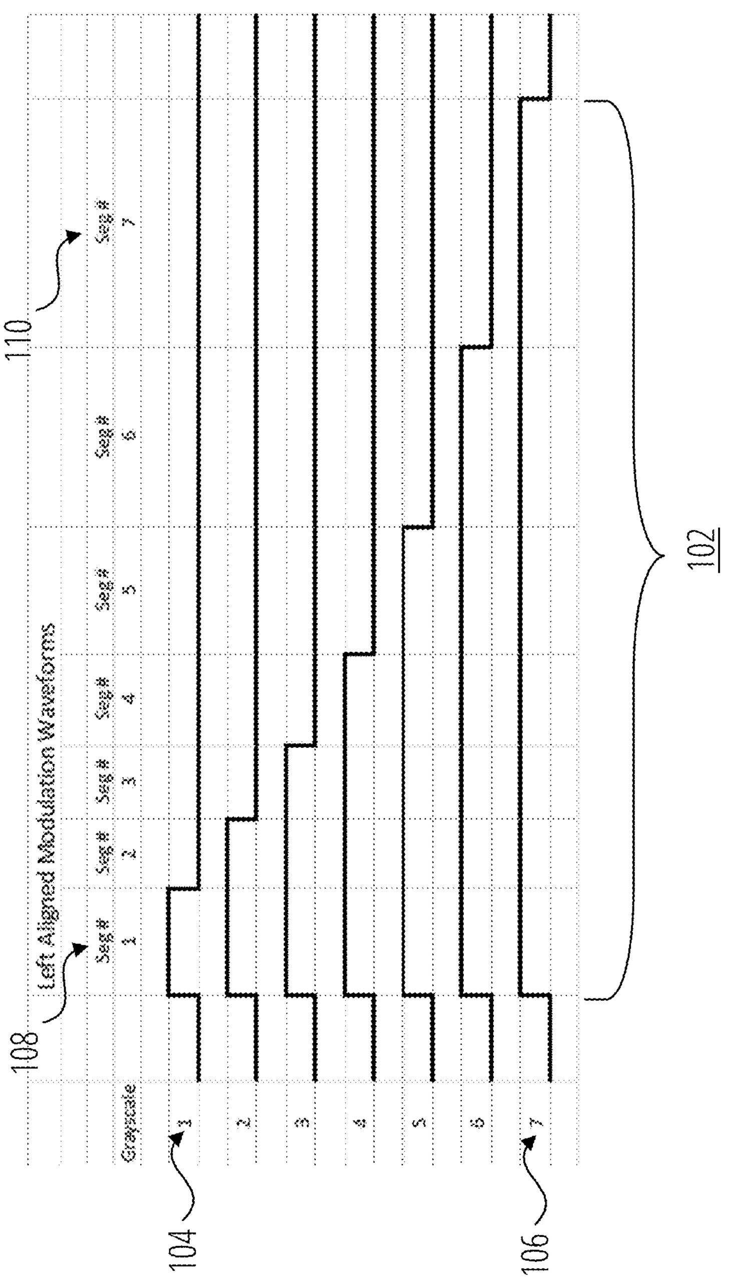
FIG. 1 is a signal timing diagram or modulation profile illustrating left aligned or leading edge aligned PWM signals, illustrating principles applicable to some examples.

Different types or modes of PWM may be utilized in controlling a display. Each of these modes may have particular advantages, or disadvantages, depending on the application for which the display is being utilized, as well as on the specific characteristics of the display. Modes of modulation utilized in PWM include leading edge aligned modulation, trailing edge aligned modulation, and dual-edge modulation (also called center-aligned modulation), as will be appreciated by those skilled in the art. In head-mounted display applications, such as in augmented reality (AR) and virtual reality (VR) headsets, visual artifacts from head motion or eye motion can be reduced by using center aligned modulation so that all pixel greyscale values appear at the same time/location. However, leading edge aligned modulation may be preferred over center aligned modulation to eliminate the presence of dark banding artifacts. These dark banding artifacts occur due to physical characteristics of an LCOS display that result in nonlinearities in the operation of adjacent pixels with dissimilar activation times (a.k.a. rising edges), as will be understood by those skilled in the art. While leading edge aligned PWM can be beneficial for this reason in AR and VR headset applications, temporal effects caused by the head movements of a wearer may result in unwanted artifacts being observed by the wearer when pixels of the LCOS display are controlled through leading edge aligned PWM; hence the need to make a solution that has the benefits of both modes without the artifacts.

Examples are described herein that provide techniques for modulating a center aligned PWM signal, where a dithering bit associated with the signal is encoded separately to enable positioning the PWM signal according to a base grayscale level, with shifts in a leading edge of a pulse of the PWM signal for centering and then extending only a trailing edge of the pulse for dither. Thus, in some examples a center aligned PWM signal applied to each pixel voltage is dithered only on the trailing edge of the PWM signal. Although the PWM signal is modulated on both the leading edge and trailing edge of the pulse of the PWM signal, the dithering is performed only on the trailing edge of the PWM signal.

Some examples described herein may attempt to address the technical problem of a darkening effect that can occur for PWM modes that utilize modulation that dithers the leading edge of a PWM signal. By instead dithering only the trailing edge of a center aligned PWM signal, this darkening effect may be reduced in some examples. Techniques described herein can be applied to various display types including, but not limited to, liquid crystal on silicon (LCoS) displays used in augmented reality displays, mixed reality displays, virtual reality displays, heads up displays, and projectors.

In color sequential modes, drive signals can include various voltage changes: the voltage levels for the active and inactive states can be unique per color, the voltage level can change somewhat during a pulse or between pulses, and the polarity of the voltage can toggle during the pulse. However, examples described herein simplify the drive by limiting the drive signal state to either the active state or inactive state.

The terms “dither” or “dithering” as used herein refer generally to spatial dithering, and more specifically to ordered dithering in which small groups or arrays of pixels or sub-pixels (e.g., a 4×4 matrix of pixels) of a display are controlled through applied PWM signals to provide varying shades of color to simulate an overall desired color. In such an ordered dithering approach, none of the pixels in the matrix actually displays the desired color, but the human eye averages the colors of the pixels in the matrix and perceives the desired color. The color of each pixel in the array is determined through a threshold map or matrix, a commonly used threshold matrix is a Bayer matrix. The Bayer matrix is applied to the original color values of the array of pixels, thereby setting a new value for the color of each pixel in the array based on a distance or magnitude between the original color of the pixel and the closest color in the reduced palette of colors available for the display being controlled, as will be described in more detail below.

As described above, electronic displays such as LC displays (including LCOS displays) may be driven by applying a PWM signal to each pixel of the display. In such a display, the voltage pulses forming the PWM signal control light emitted from the corresponding pixel of the display. Each pulse is defined by a level (e.g., a voltage level) and a duration (also referred to as a width). Each PWM signal is applied across a pixel electrode and a common electrode of the corresponding pixel to thereby control the optical properties of an LC material between the pixel and common electrodes. The common electrode is common to all the pixels of the display, whereas each pixel has a separate pixel electrode. In the present description, these electrodes specific to each pixel may be referred to collectively as “pixel electrodes” or simply as “electrodes” of the pixel.

Modulating a duration of the pulses of the PWM signal applied across the pixel electrodes of each pixel changes an effective value over time of the voltage applied across the LC material between these electrodes. Through such PWM signals applied to pixels of an LCoS display, grayscale image generation is achieved through the pixels of the display. This operation of an LCoS display through the application of a PWM signal to control an intensity from each pixel is a form of digital operation of the LCOS display, because the PWM signal is a digital signal having one of two voltage levels. Grayscale operation of the display, meaning varying an intensity light from each pixel of the LCOS display between a maximum value and a minimum value, is achieved through application of PWM signals to the pixels. The PWM signal applied to each pixel corresponds to writing a fast series of 1’s and 0’s to each pixel, which causes the LC material of the pixel to be alternately driven between a fully ON and a fully OFF state. The fully OFF state of the liquid crystal may be referred to as an “extinction” state, meaning that the LC material returns to its untwisted or relaxed state when no voltage is applied across the material. As the LC material transitions between the fully ON and fully OFF states, a fraction of the light is permitted to pass in a non-linear correlation to percentage of change between the two states. These changes in state of the LC material of the pixel between fully ON and OFF happen much faster than the human eye can detect and, as a result, the eye responds to the average of the varying intensity profile created by these ON and OFF drive states as the equivalent grayscale intensity for the pixel. In the following description, changes to the state of the LC material of a pixel may simply be referred to as changes to the state of the pixel.

In applying the PWM signal to drive each pixel, drive circuitry for the display applies a periodic digital voltage signal to the pixel electrode of the pixel, with an active period or duration of the periodic digital voltage signal being a function of the desired grayscale level or intensity for the pixel. Further, the drive circuitry of the LCOS display alternately supplies one of two values or levels of a reference voltage to the common electrode of the pixels. In some color sequential displays, there is a unique pair of reference voltages for each color provided by the pixels of the display. The reference voltage provided by the drive circuitry on the common electrode of each pixel is typically referred to as a common voltage signal $V_{com}$. The LC material responds to the absolute value of the magnitude of the voltage differential between the pixel electrode and the common electrode, in either the positive or negative polarity. A small delta voltage is the inactive state and a large delta voltage is the active state. Typically, during operation of the LCOS display changes to the common voltage signal $V_{com}$ are synchronous with changes in the PWM signal supplied to the pixel electrode of each pixel, enabling pixels to maintain the same state with opposite delta voltage polarity, and may occur multiple times during a modulation profile of the pixel. The modulation profile of a pixel will be described in more detail below. Typically, the drive circuitry drives or toggles both the PWM signal and the common voltage signal $V_{com}$ to an opposite or complementary state or level when no change in the state of the pixel is desired. This toggling of the PWM and $V_{com}$ signals causes an inversion event of the LC material of the target pixel and has no effect on the light modulation behavior of the LC material of the pixel. These inversion operations, which are typically referred to as “pixel inversion,” maintain a time-average zero bias across the LC material of each of the pixels, which is necessary to ensure proper long term operation of the LCOS display, as will be understood by those skilled in the art. In the following description and diagrams, the modulation profile of the PWM signal on the pixel electrode of a pixel will ignore these inversion events, which can be applied as an independent overlay on the modulation profile, in order to simplify representation of the modulation profile.

Left aligned asymmetric mode, right aligned asymmetric mode, and center aligned symmetric mode are three PWM modes of operation. PWM is a form of signal modulation where, in this context, the durations or widths of pulses of the PWM signal correspond to specific grayscale values that determine a brightness or intensity of a pixel. In left aligned asymmetric PWM mode, the leading edge of a voltage pulse is fixed, and the trailing edge is modulated or changed in accordance with the grayscale value of the pixel. In right aligned asymmetric PWM mode, the trailing edge of a voltage pulse is fixed, and the leading edge is modulated or changed in accordance with the grayscale value of the pixel. In center aligned symmetric PWM mode, both the leading and trailing edges of a voltage pulse are modulated or changed in accordance with the grayscale value of the pixel.

The number of modulation steps that can be supported is dependent on application specific constraints of resolution, frame rate, clock speeds, bus widths, etc. The following examples use a limit of 3-bit encoding for the base grayscale value, supporting 7 or 8 non-zero grayscale values with 8 or 9 modulation events, to simplify the diagrams. Practical systems will implement higher numbers of modulations using more bits for encoding.

FIG. 1 is a signal timing diagram or modulation profile illustrating left aligned (also referred to as leading edge aligned) PWM signals. All non-zero grayscale levels start their pulse at the beginning of the illumination window 102. The lowest grayscale level 104 ends the pulse at the soonest modulation event after it was started, after segment #1 108 of the illumination window 102; each successively higher gray level extends the pulse (or maintains the pulse) to the next modulation event, for a longer duration approaching the maximum pulse width for the highest grayscale level 106 at the end of the illumination window, after segment #7 110 of the illumination window 102. Because dithering from one grayscale level to the next higher grayscale level means extending the duration of the pulse, it can be said that the dithering occurs on the trailing edge of the pulses, for each of the grayscale levels 104 through 106.

Figure 2:
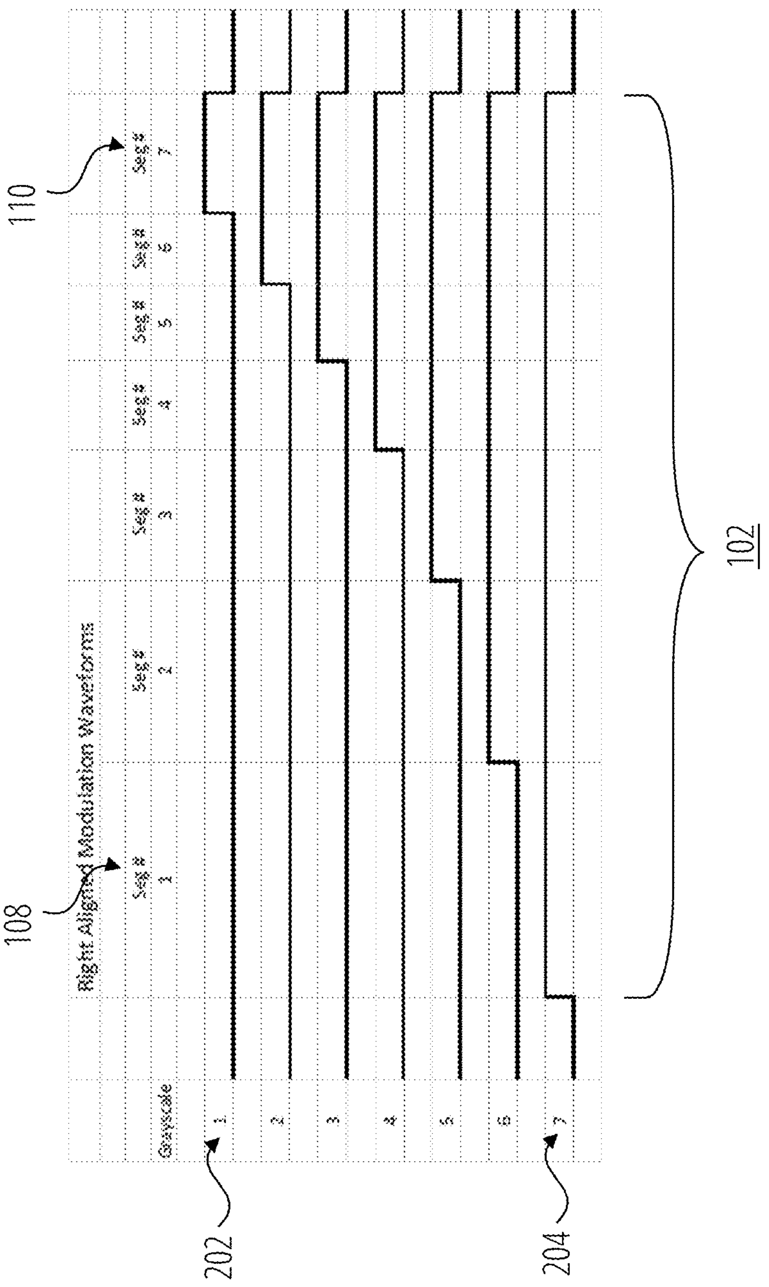
FIG. 2 is a modulation profile illustrating right aligned or trailing edge aligned PWM signals, illustrating principles applicable to some examples.

FIG. 2 is a modulation profile illustrating right aligned (also referred to as trailing edge aligned) PWM signals. All non-zero grayscale levels finish their pulse at the end of the illumination window 102, after segment #7 110. The lowest grayscale level 202 starts the pulse at the soonest modulation event before the ending modulation event (i.e., in this example, at the beginning of segment #7 110); each successively higher grayscale level extends the pulse to (or starts the pulse at) the previous modulation event, for a longer duration approaching the maximum pulse width for the highest grayscale level 204 which starts at the beginning of the illumination window 102, before segment #1 108. Because dithering from one grayscale level to the next higher grayscale level means starting the pulse earlier, it can be said that the dithering occurs on the leading edge of the pulses for each of the grayscale levels.

Figure 3:
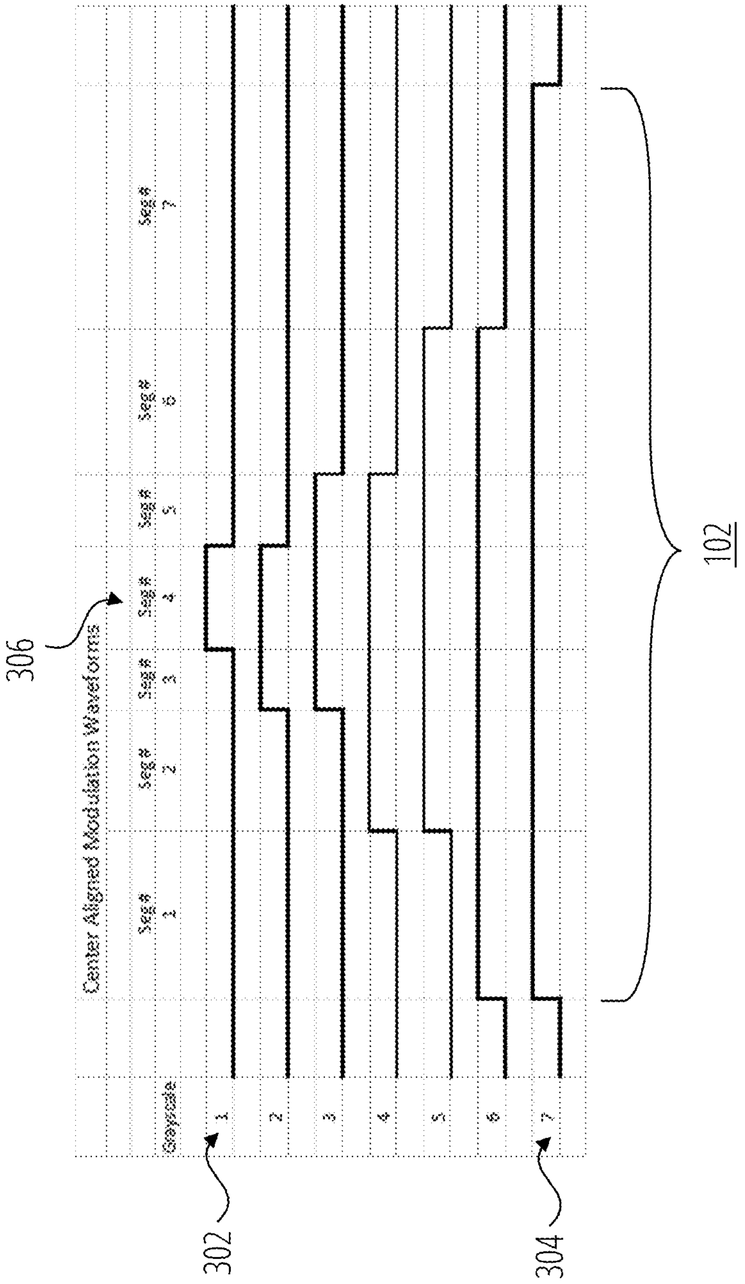
FIG. 3 is a modulation profile illustrating center aligned PWM signals, illustrating principles applicable to some examples.

FIG. 3 is a modulation profile illustrating center aligned PWM signals. The lowest grayscale level 302 pulse is asserted during the middle of the illumination window (over segment #4 306). Successive grayscale levels extend the pulse width by either adding to the end or the beginning of the previous level's pulse, up through the highest grayscale level 304. If dithering only uses these base pulse positions, then dithering occurs on either the leading or trailing edges; typically for even/odd adjacent grayscale levels, where there is a change in the pulse edge. For example, the pulses shown in FIG. 3 alternate between dithering by extending the leading edge (for even grayscale levels 2, 4, and 6) and dithering by extending the trailing edge (for odd grayscale levels 3, 5, and 7).

In many display systems, hardware limitations, as stated earlier, constrain the number of modulation changing events in a given portion of the frame time, such as over the illumination window 102. A modulation changing event is a change in the characteristics of the PWM signal that results in a change in perceived illumination: for example, a difference in pulse width. In some cases, the full number of desired grayscale levels in the data cannot each be matched with a corresponding modulation event. For example, 8 bits of data per color would provide 255 grayscale levels, but only 31 modulation segments may be available in the given portion of the frame time (e.g., during the illumination window 102). In many systems the display response to each PWM signal pulse is non-linear, and the desired gamma representation of the input data is non-linear; in such systems, the target spacing between modulation events is not linear. For example, the hardware constraints may allow 32 evenly spaced modulation events, but only 16 modulation events spaced non-linearly to match the target gamma behavior. As a result, a subset of the total grayscale levels are selected as the native levels that correspond to achievable modulation pulse widths for pulses of the PWM signal. For example, 31 achievable unique widths or native levels for pulses of the PWM signal would represent a 5-bit native profile for the PWM signal. The remaining grayscale levels for the data are achieved using dithering between the native levels. In some examples, this dithering can be spatial dithering, in which adjacent pixels are driven at selected native levels and combine to approximate the target grayscale level (e.g., ordered matrix dithering). In some examples, temporal dithering may be utilized, in which sequential fields or frames of the native levels average to the target grayscale. A combination of spatial and temporal dithering may also be used in some examples.

In some instances, the fringe-field effects of spatial dithering methods that involve modulating a leading edge of a PWM signal are associated with a darkening effect that persists through a whole color sub-frame. This darkening effect may last for more than one frame if the LC material does not go all the way to extinction between sub-frames.

Due to these fringe-field effects, conventional dithering approaches have not used dithering schemes that include right aligned modulations or center aligned modulations, because both such approaches may include leading edge modulation, which causes the darkening effect. As a result, prior dithering approaches have only used trailing edge modulation for driving amplitude mode LCOS displays.

However, center aligned PWM modulation—which typically includes leading edge and trailing edge modulation, as in the even grayscale values of FIG. 3—can exhibit certain beneficial characteristics for addressing other technical problems. For example, center aligned modulation can be useful for providing temporal motion stability across all grayscale levels, with a time weighted center of each level being in the same location of the display.

Examples of PWM techniques are described herein with reference to a system in which a PWM voltage signal is applied to one or more pixels of a display and drives the illumination output of each pixel. In some examples, a pixel includes an individual reflective element (e.g., a metallic mirrored element), a common electrode (which, for example, is shared with other pixels), and a liquid crystal material that is positioned therebetween.

A digital pulse width modulation scheme is utilized in a display system, in accordance with examples described herein, as the driving sequence for representing different gray levels. A center aligned PWM method is utilized to drive pixels of the display. The center aligned modulation technique involves changing or modulating both the leading and trailing edges of a pulse.

In some examples, the center aligned PWM technique employs binary drive sequences that use n bits (referred to as select bits) to select the base modulation pulse width and 1 additional bit (referred to as the dither bit) to select the next higher pulse width resulting from the dither matrix operations on the lower order grayscale bits representing the grayscale levels between the native levels. These n+1 bit sequences are used to modulate each pixel of the display: e.g., a four (4) bit base modulation (also referred to as a native modulation) has 15 or 16 active modulation segments corresponding to 4-bit codes, whereby any of the 4 select bits are not zero. The dither bit is provided separate from the select bits, such that the modulation system can treat the two conditions differently: i.e., the case of select=x (wherein, e.g., $0<x<2^4$) with the dither bit asserted (e.g., dither bit=1) can be different from the case of select=x+1 with the dither bit not asserted (e.g., dither bit=0).

The trailing dither methodology depends on this separation of the dither bit from the base select bits, instead of just adding it to the base select (limiting the max value to not exceed $2^n-1$) to get a resulting n-bit modulation select code.

In some examples, the value of n denoting the number of select bits can range from 3 to 8 bits, and can vary between colors. The n select bits with the 1 dither select bit added to them represent a binary encoding of a grayscale level. The encoded grayscale level corresponds to a desired PWM pulse width for the modulation utilized to drive pixels of the display by the display drive circuitry, such that the pixels output the corresponding grayscale illumination intensity.

In some examples, when the select bits are at the maximum binary value (e.g., "1111"), then the dither bit is ignored, resulting in saturation for grayscale values above the maximum native grayscale. In some examples, an extra modulation segment provides an additional available pulse width (e.g. for n=4, a $16^{th}$ available pulse width), selected by the maximum select value and the dither bit asserted, which eliminates the saturation problem when the dither bit is added to the maximum native grayscale value. It will be appreciated by one of ordinary skill in the art that the number of select bits utilized to modulate the pixels of the display may vary according to the native modulation capability of the display or modulation sequence.

It is also possible to implement modulation sets that do not correspond to a power of 2, matching n select bits (a.k.a. fractional bit depth). For example, the hardware may limit the number of modulation events to 24, which is halfway between 4 and 5 select bits. If the source image data is 8-bits per color, it can be attenuated by a scale of 184/255 or 191/255, so that a 5-bit base select code only uses values from 0 to 23. In this case the dither bit would be a sixth select bit representing the result of the dither matrix operation on the remaining 3 bits of the scaled 8-bit value.

Various examples described herein for center aligned PWM with trailing edge dithering are independent and distinct from spatial dithering, and may be compatible with one or more forms of spatial dithering, such as threshold matrix dithering or error diffusion dithering. Temporal dithering—in which different dither levels are applied in successive frames or color sub-frames—may be overlaid or combined with spatial dithering in a display system, and the dither bit supplied to the modulation system in examples described herein would be the resulting bit from the combined dither methods.

It will be appreciated that references to a bit, such as the dither bit, having a "value" may refer to either of two binary values of the bit. References to a bit being "asserted" or "set" may refer to a designated value of the bit that has a specific effect within the encoding/decoding scheme; the choice of designated or asserted value in defining the scheme is arbitrary and may be either 1 or 0, high or low, and so on in various examples. Unless otherwise indicated, examples described herein use a bit value of 1 to indicate an asserted bit, and a value of 0 to indicate a non-asserted bit. References to a bit value being "inverted" relative to a first value (e.g., 0) refer to the other or opposite binary value from the first value (e.g., 1).

Example schemes are described herein for encoding or otherwise generating binary encodings in which the dither bit for each pixel is not added to the base grayscale level for the pixel encoded in the select bits, but is instead kept separate and distinct from the select bits. In other words, there exists at least one grayscale value x encoded by the n select bits such that inverting the value of the dither bit (e.g., from 0 to 1 or from 1 to 0) has an effect different from setting the grayscale value encoded by the select bits to (x−1) or (x+1). This does not preclude the possibility that a scheme according to examples described herein may encode some grayscale values that are incremented or decremented by the inversion of the dither bit value; however, the example schemes described herein contain at least one case in which a grayscale value x is not simply incremented or decremented by the inversion of the dither bit value. This independence or distinctness of the dither bit from the select bits differs from conventional approaches to PWM, in which all bits used to encode a pulse are used to determine the width of the pulse. In contrast, some examples described herein may use the dither bit to select other characteristics of the pulse, such as a temporal location of the leading edge of the pulse within the illumination window 102. Examples of schemes for encoding and decoding binary encodings are described below with reference to the system of FIG. 8, the modulation control system of FIG. 9, the timing diagrams of FIG. 4 through FIG. 7, the lookup tables of FIG. 12 and FIG. 13, and the machine of FIG. 15.

In some examples, the leading edges (also called rising edges herein, meaning the rise of the LC response not the rise of a voltage) of voltage pulses sent to adjacent pixels are temporally aligned, thereby potentially preventing or mitigating the dark banding artifact visible in an image presented by a display when the leading edge of a voltage pulse sent to one pixel does not align temporally with a leading edge of a voltage pulse sent to an adjacent pixel. In some examples, a pulse having a width determined by a select value (encoded by the n select bits) of x+1, and having its dither bit asserted, may be shifted earlier in time to align its leading edge with other pixels that have the same select value but the opposite dither bit state (i.e., a non-asserted dither value). Similarly, a pulse having a width corresponding to select value x with the dither bit asserted may process the asserted dither bit to extend the width of the pulse to the next available width, thereby keeping the leading edge of the pulse aligned with other pixels at the same select value but without the dither bit asserted. By grouping adjacent pixels together at a shared temporal location for their leading edges, regardless of whether the pixels have identical or off-by-one select values, such example encoding/decoding schemes can prevent or mitigate the aforementioned dark banding artifact caused by many adjacent pixels having non-aligned leading edges.

In an image with a slowly transitioning grayscale gradient or shading, there will be a smooth transition from one grayscale level to the next as the image progresses through different levels of dithering between adjacent select values (also called base levels, native base levels, base grayscale levels, or native base grayscale levels). Additionally, when the gradient transitions through one native base level to the next, if the pulse is extended on the trailing edge, the dithering of the pixels in the image will present visually as a smooth transition between the two base levels. However, in this proposed approach to center aligned PWM dithering, when the step from one base level to the next base level of the center aligned modulation requires the leading edge to move earlier in time, the temporal mismatch between the leading edges of adjacent pixels on the borders of two adjacent pixel regions may produce a narrow darkening effect (on the order of 1 pixel wide) at the boundary of these two regions. This fringe-field effect is typically less pronounced with higher native bit depth modulations and/or faster color sub frame (CSF) rates, due to the reduced time between modulation events, which shortens the duration of the modulation segment, thereby limiting the fringe-field effect. However, examples described herein may use contour blending techniques that may diminish this effect.

FIG. 4 through FIG. 7 illustrate examples of several schemes for center aligned binary encodings that use different approaches to alignment of leading pulse edges. As in FIG. 1 through FIG. 3, each timing diagram in FIG. 4 through FIG. 7 shows select value and dither value encodings of the seven possible pulse width options (i.e., seven base levels), using three select bits in each example for simplicity. It should be understood by one of ordinary skill in the art that examples described herein are applicable and operate according to the same principles regardless of the number of select bits and base levels, including 4-select-bit encodings with 15 pulse widths, 5-select-bit encodings with 31 pulse widths, etc. In the diagrams of FIG. 4 through FIG. 7, each row represents a different data level modulation as selected by a pixel's grayscale level (base bits and dither bit) and represents a different pulse width of the PWM or different alignment of the pulse. Each of the columns represents sequential modulation segments in time, used to build up the modulation pulses. It will be appreciated that, in the illustrated examples, the column widths are not the same as each other, representing the timing that could be used to create a desired gamma response from the LC behavior. However, the column widths are not to scale and only imply a general variation in time. The transitions between columns represent a modulation event, which is when the pixels have the opportunity to change state.

Figure 4:
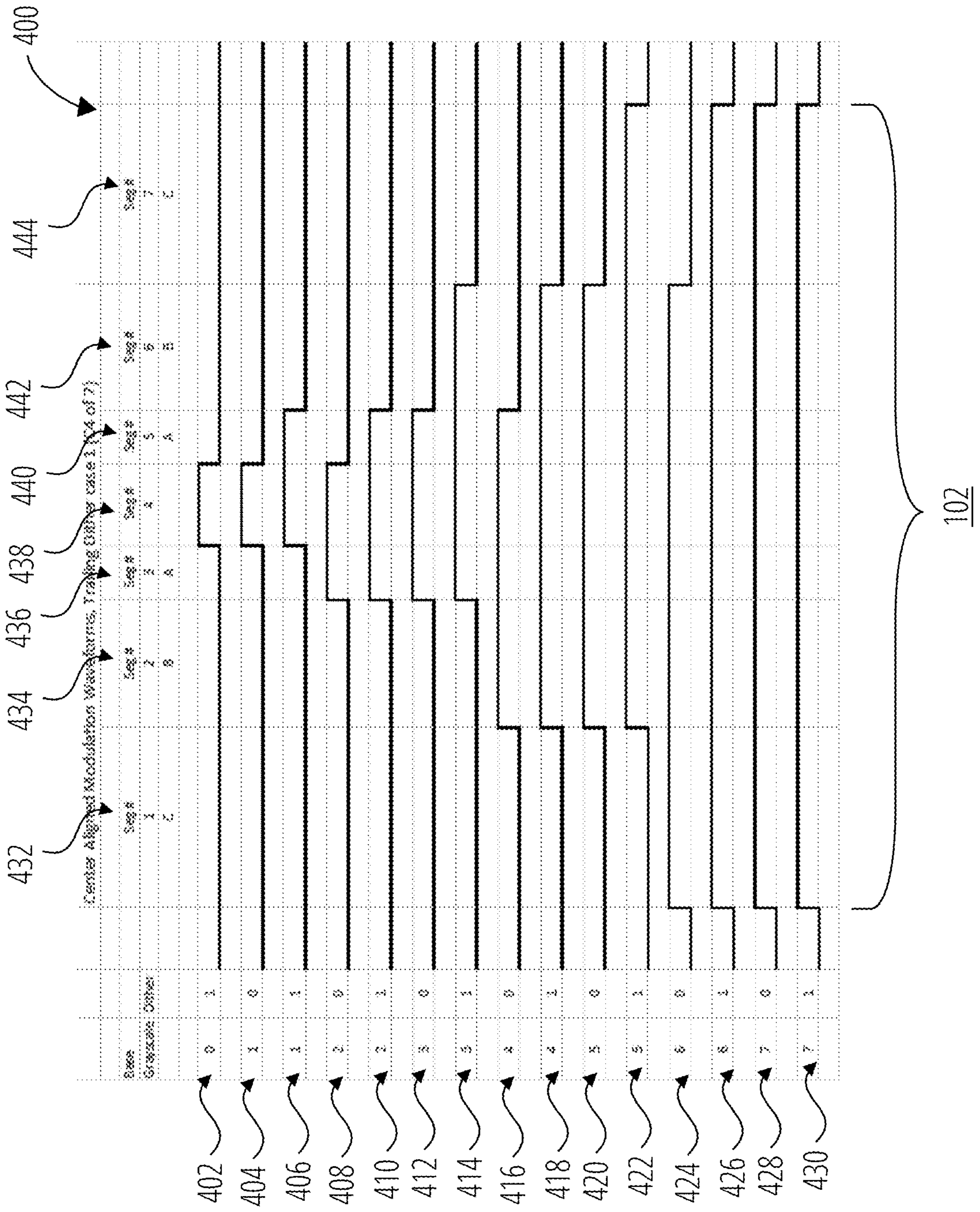
FIG. 4 is a first example modulation scheme illustrating center aligned PWM signals with trailing dither, according to some examples (4 start times, 7 segments).

FIG. 4 is a first example modulation scheme 400 illustrating center aligned PWM signals with trailing dither. First example modulation scheme 400 has the same base levels as the center aligned scheme of FIG. 3, i.e., both show seven different pulse widths (from 1 segment to 7 segments), with the lowest base grayscale level (select value 1, dither bit not asserted 404) nearly centered in the illumination window 102, spanning segment #4 438 of 7 segments. However, the first example modulation scheme 400 expands upon the scheme of FIG. 3 by adding, for each of the select values 1-7, an additional row showing the effect of asserting the dither bit (for the purposes of this description, the row with the dither bit not asserted may be considered a default state corresponding to the same select value of the scheme of FIG. 3).

In contrast to FIG. 3, a row is added to FIG. 4 for a select value of 0 with the dither bit asserted, which is the same 1 segment pulse as select value 1 with the dither bit not asserted. The case of select value 0 with the dither bit not asserted is not illustrated, as it would simply be a flat line with no pulse, representing a grayscale value of 0, which is a completely dark pixel. It will be appreciated that, for each select value shown in FIG. 4, asserting the dither bit extends the pulse by one segment of width on the trailing edge. Thus, a first row showing select value 0 402 with the dither bit asserted corresponds to a select value of 0 (i.e., no pulse—this row is not shown in FIG. 3) with a pulse extended on the trailing edge by one segment (i.e., to span segment #4 438 instead of spanning no segments). Each subsequent select value follows the same pattern: select value 1, dither bit not asserted 404 is identical to select value 1 (i.e. lowest grayscale level 302) in FIG. 3, and select value 1, dither bit asserted 406 extends the pulse by one segment on the trailing edge (to span segment #5 440 as well as segment #4 438). Select value 2, dither bit not asserted 408 is identical to select value 2 from FIG. 3, and select value 2, dither bit asserted 410 extends the pulse by one segment on the trailing edge (to span segment #5 440 as well as segment #3 436 and segment #4 438). Select value 3, dither bit not asserted 412 is identical to select value 3 from FIG. 3, and select value 3, dither bit asserted 414 extends the pulse by one segment on the trailing edge (to span segment #6 442 as well as segment #3 436 through segment #5 440). Select value 4, dither bit not asserted 416 is identical to select value 4 from FIG. 3, and select value 4, dither bit asserted 418 extends the pulse by one segment on the trailing edge (to span segment #6 442 as well as segment #2 434 through segment #5 440). Select value 5, dither bit not asserted 420 is identical to select value 5 from FIG. 3, and select value 5, dither bit asserted 422 extends the pulse by one segment on the trailing edge (to span segment #7 444 as well as segment #2 434 through segment #6 442). Select value 6, dither bit not asserted 424 is identical to select value 6 from FIG. 3, and select value 6, dither bit asserted 426 extends the pulse by one segment on the trailing edge (to span segment #7 444 as well as segment #1 432 through segment #6 442).

Finally, as an exception to the pattern, select value 7, dither bit not asserted 428 is identical to select value 7 from FIG. 3, and select value 7, dither bit asserted 430 replicates the same pulse as select value 7, dither bit not asserted 428 because the pulse cannot be extended. Thus, the maximum select value of 7 with the dither bit asserted is a special case, because there is no segment beyond the seventh (segment #7 444), so the pulse is the same width with the same leading edge temporal location as when the dither bit is not asserted; this causes the maximum grayscale value to be used in controlling the pixel at the maximum select value, leading to a saturated response curve above that point. Conventional approaches to PWM tolerate the saturation, by limiting the input data to stay at or below the maximum base level or scaling the input data to match the maximum input data value to the maximum base level. Other examples, such as some examples described with reference to FIG. 5 through FIG. 7 below, may adopt different approaches to the issue of saturation.

In FIG. 4, it can be observed that there are 3 transitions in the leading edge of the pulses, which are at the start of the even base levels with no dither bit asserted (i.e., at select value 2, dither bit not asserted 408, select value 4, dither bit not asserted 416, and select value 6, dither bit not asserted 424). As described above, these are boundaries between the various binary encodings where pulses of the same width are not aligned. This creates 3 sets of paired segments: segment #3 436 and segment #5 440 are set A, segment #2 434 and segment #6 442 are set B, and segment #1 432 and segment #7 444 are set C. In some examples, the segments that are paired together have the same duration, so that the resulting full pulses of the corresponding transition have the same width (e.g., segment #3 436 and segment #5 440 may have the same duration to ensure that select value 1, dither bit asserted 406 and select value 2, dither bit not asserted 408 encode the same pulse width). This may cause some deviation from the target gamma curve; in some examples, the deviation is split so that one segment is too short and the other is too long. This is especially true for the last segment (e.g., segment #7 444), which would ideally be the longest; shortening segment #7 444 and increasing segment #1 432 will keep the overall pulse of 7 segments in width at the same width, but a pulse of 6 segments in width may be longer than ideal, and a pulse of 5 segments in width could be unchanged or it could be adjusted to reduce the error in the 6-segment pulse. Similar tradeoffs can be applied to the other segments to minimize the error in the shorter pulses. An alternative approach is shown in the example scheme of FIG. 5, which has fewer paired segments.

Figure 5:
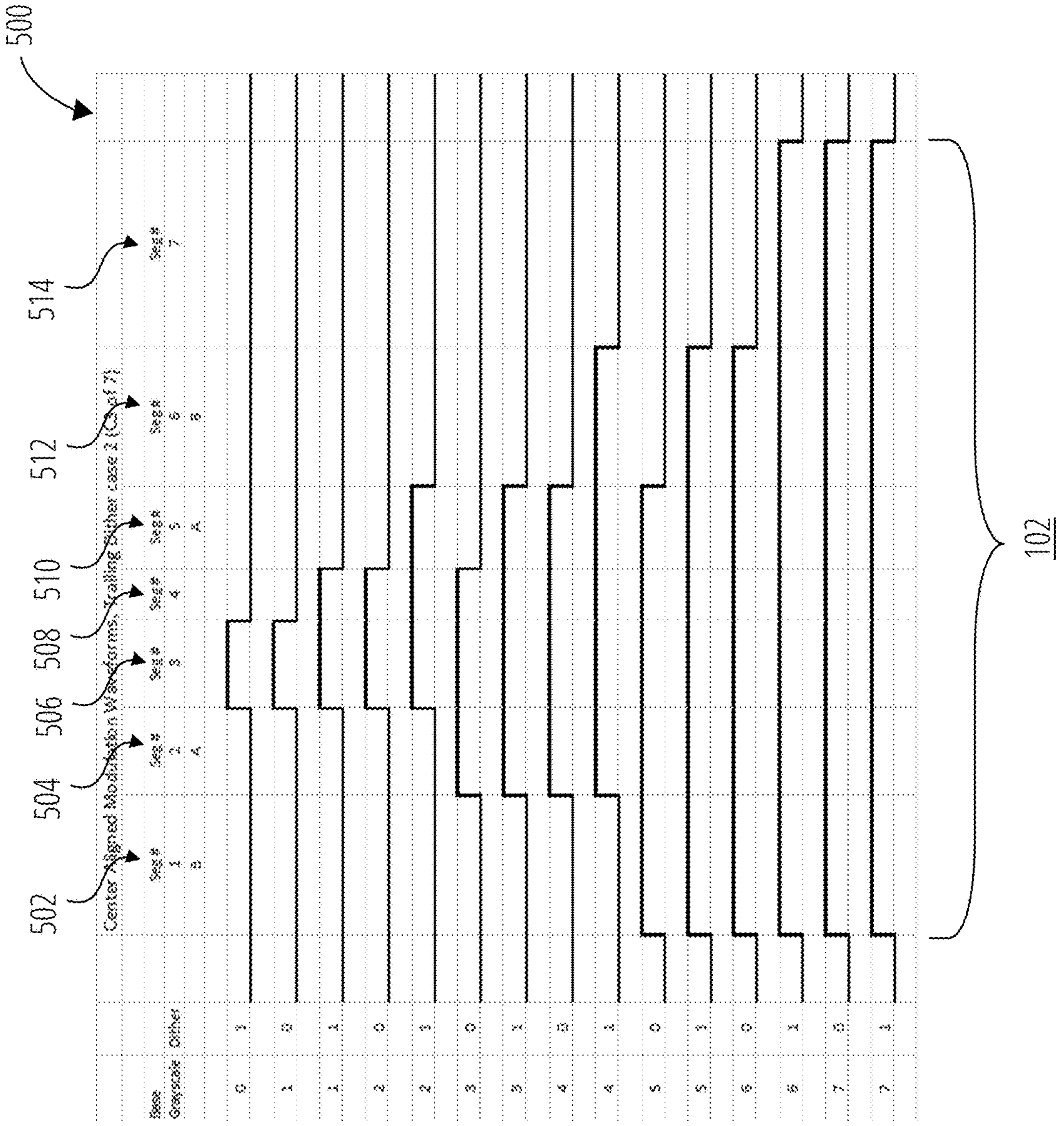
FIG. 5 is a second example modulation scheme illustrating center aligned PWM signals with trailing dither, according to some examples (3 start times, 7 segments).

FIG. 5 illustrates a second example modulation scheme 500 in which the pulses for select values of 0 and 1 are placed slightly off center, starting in segment #3 506 instead of segment #4 508 (in contrast to first example modulation scheme 400). Similarly, the intermediate odd base level pulses (for select values 3 and 5, but not the maximum select value of 7) have their leading edges shifted forward (i.e., left) by one segment. This results in only 2 leading edge transitions, thus only 2 sets of paired segments: the 2nd and 5th segments (504 and 510) are paired; and the $1^{st}$ and $6^{th}$ segments (502 and 512) are paired. That leaves the $3^{rd}$, $4^{th}$ and $7^{th}$ segments (506, 508, 514) unpaired, which allows the corresponding pulse widths to be more accurately timed to match the target pulse widths. This may cause less deviation from the target gamma curve than the first example modulation scheme 400; the amount of deviation can be adjusted as a tradeoff with other system factors determined by the designer during implementation, and can be varied in different examples. In some variants of the second example modulation scheme 500, more center offset can be applied to applications of greater bit depth to relax the paired timing constraints and still maintain near centered alignment. In other examples, a different alignment pattern can be used to mix constrained and unconstrained modulation segment timings. In various such examples, the leading edges of the pulses are kept aligned as between the two pulses (with and without the dither bit asserted) for the same select value.

Figure 6:
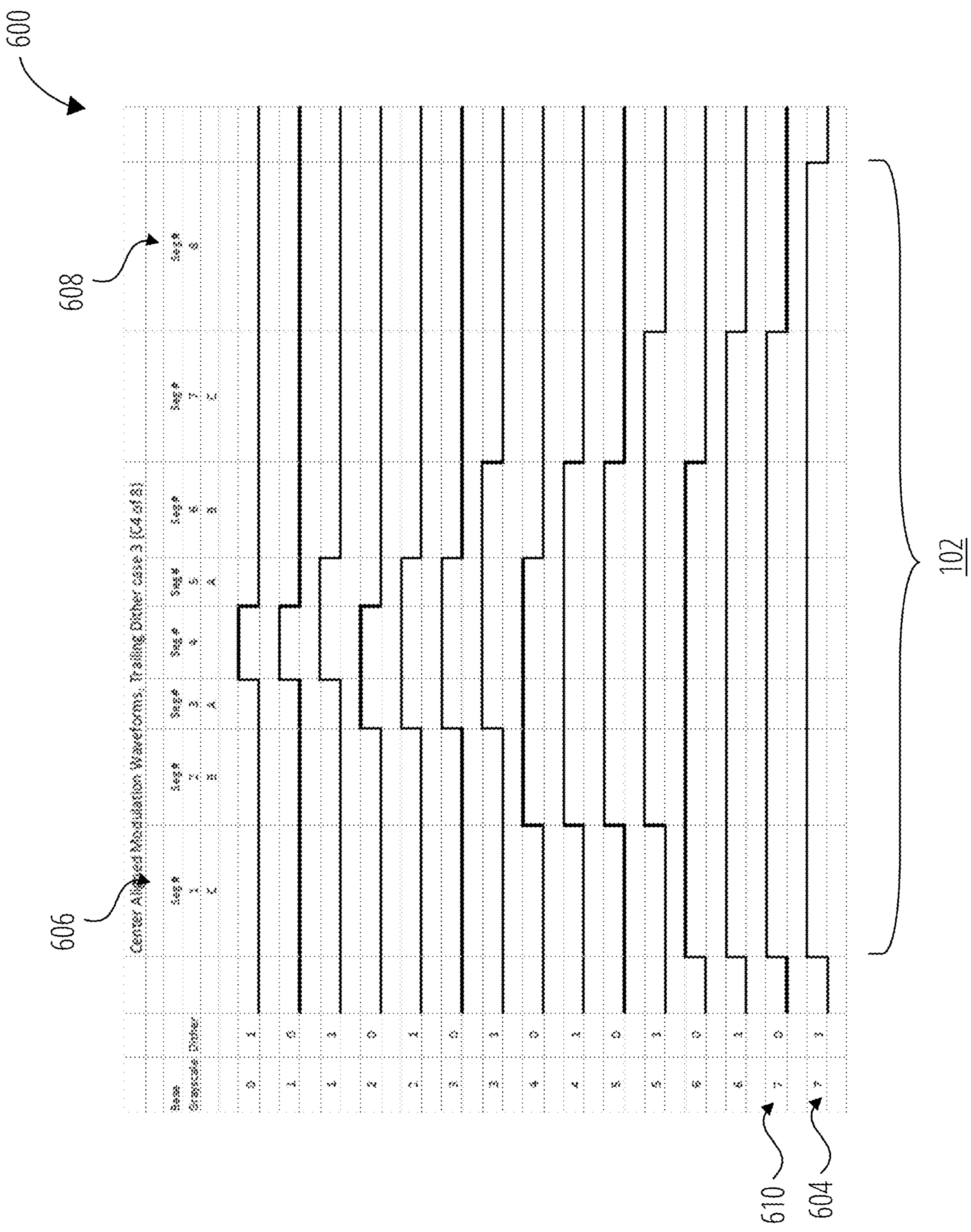
FIG. 6 is a third example modulation scheme illustrating center aligned PWM signals with trailing dither, according to some examples (4 start times, 8 segments).
Figure 7:
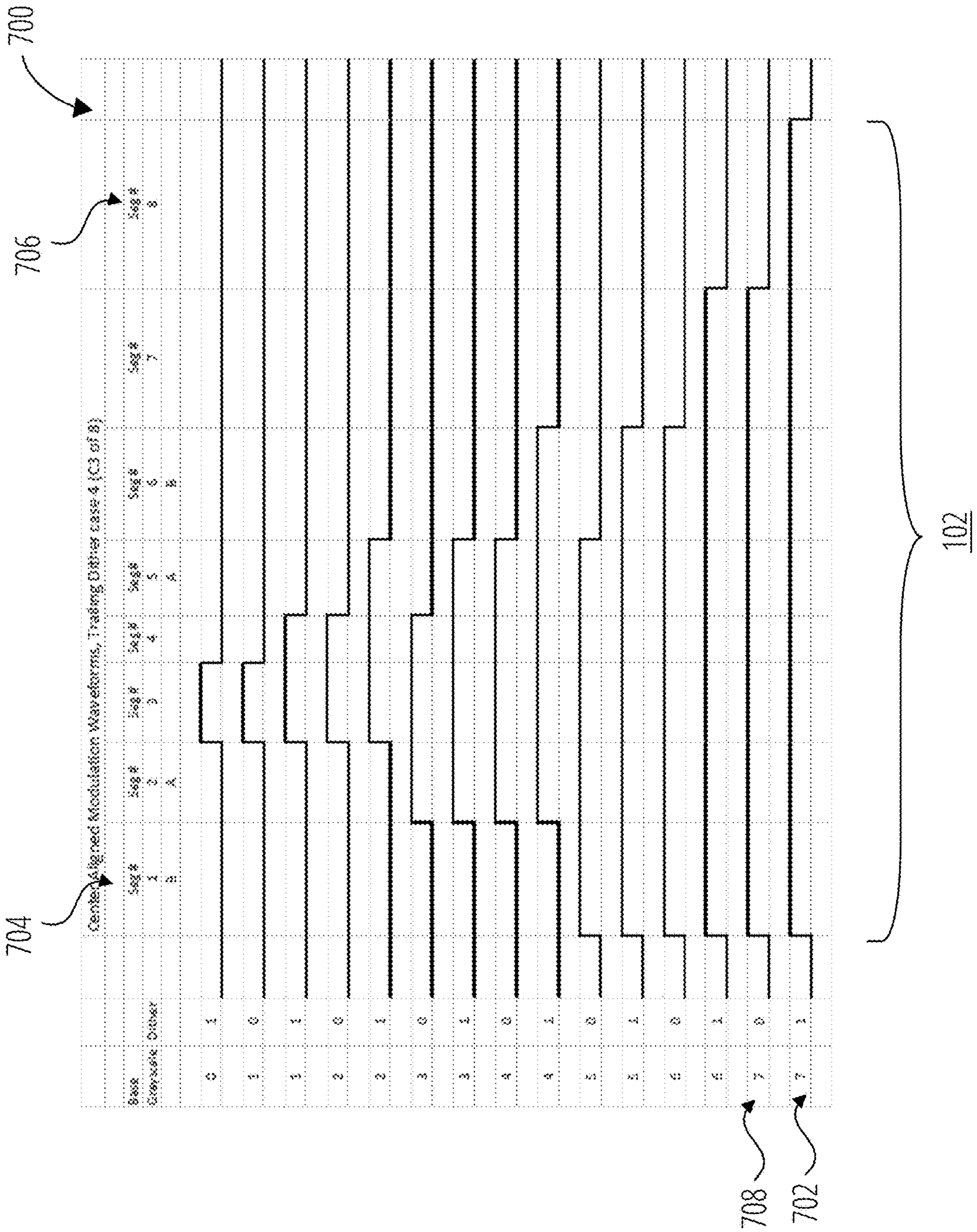
FIG. 7 is a fourth example modulation scheme illustrating center aligned PWM signals with trailing dither, according to some examples (3 start times, 8 segments).

FIG. 6 and FIG. 7 are similar to FIG. 4 and FIG. 5, respectively, except that an additional segment has been added at the end (segment #8 608) to enable dithering above the maximum base level as a way of addressing the saturation problem. This is possible because the separate dither bit provides the ability to encode a state above the maximum binary count of the select bit depth n (e.g., in the examples shown in FIG. 6 and FIG. 7, the maximum 3-bit binary value encoded by the select bits is a 7 and would only allow up to 7 segments). By supporting this 8-segment case, some examples avoid the necessity of limiting the input value range and may avoid the need to re-scale the input values to stay at or below the maximum select value.

Thus, FIG. 6 shows a third example modulation scheme 600 in which pulses can be encoded spanning zero segments (i.e., no pulse) up to eight segments (including segment #8 608). The third example modulation scheme 600 is identical to first example modulation scheme 400, except that the select value 7, dither bit asserted 604 encoding results in a pulse spanning from segment #1 606 through segment #8 608, instead of replicating the pulse of the select value 7, dither bit not asserted 610 encoding.

Similarly, FIG. 7 shows a fourth example modulation scheme 700 in which encodings of the signal patterns from FIG. 5 are encoded by the same select values and dither values, with the exception that the select value 7, dither bit asserted 702 encoding spans eight segments from segment #1 704 through segment #8 706 instead of replicating the pulse pattern from select value 7, dither bit not asserted 708. The fourth example modulation scheme 700 illustrates that the pulse profiles for a scheme having n select bits and with the dither bit asserted, is the same as the pulse profiles for a scheme having n+1 select bits and with the dither bit not asserted.

It will be appreciated that, in some examples, the saturation issue exhibited by the examples of FIG. 4 and FIG. 5 may be more pronounced due to a limited timing window and/or the position of the pulse within the timing window. Thus, whereas the examples of FIG. 6 and FIG. 7 can encode $2^n$ different pulse widths using n select bits, and the examples of FIG. 4 and FIG. 5 can encode $2^n-1$ different pulse widths using n select bits, in other examples, the number of pulse widths that can be encoded using n select bits may be fewer than $2^n-1$.

It will be appreciated that, in some examples, the saturation issue exhibited by the examples of FIG. 4 and FIG. 5 may be more pronounced due to a limited timing window and/or the position of the pulse within the timing window. Thus, whereas the examples of FIG. 6 and FIG. 7 can encode $2^n$ different pulse widths using n select bits, and the examples of FIG. 6 and FIG. 7 can encode $2^n-1$ different pulse widths using n select bits, in other examples, the number of pulse widths that can be encoded using n select bits may be fewer than $2^n-1$.

Computing System

Figure 8:
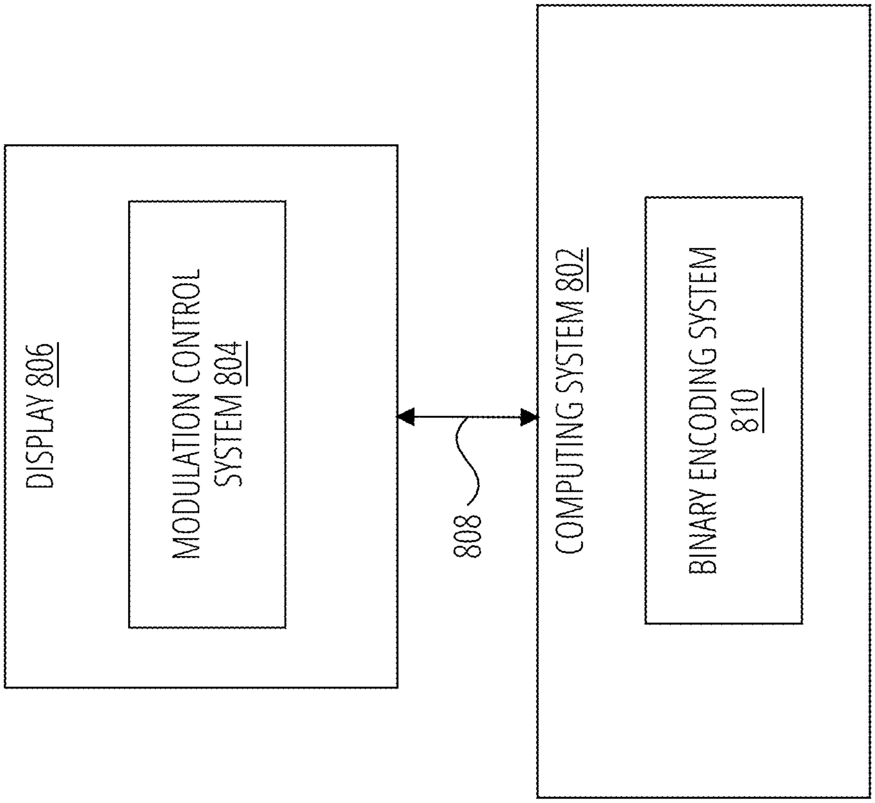
FIG. 8 is a block diagram of a computing system configured to generate and transmit binary encodings for control of pixels of a display, according to some examples.

FIG. 8 shows a block diagram of a computing system 802 configured to generate and transmit binary encodings for control of the pixels of a display 806. In some examples, the display 806 is considered part of the computing system 802. In some examples, the display 806 and computing system 802 system are components of a larger system.

The display 806 includes a modulation control system 804 and a communication link 808. The modulation control system 804 is configured to receive and decode binary encodings to the display 806, and is described below with reference to FIG. 9.

The computing system 802 includes a binary encoding system 810 for generating binary encodings for controlling pixels of the display 806, such as the encodings described above with reference to FIG. 4 through FIG. 7.

The communication link 808 is used to transmit the binary encodings to the display 806. The communication link 808 can be implemented by any suitable wired or wireless communication technology, such as a data bus or a high speed digital link (such as USB-C, HDMI, MIPI, etc.).

In some examples, the display 806 is configured to receive binary encodings from the computing system 802, decode the binary encodings to generate pulse signal patterns for individual pixels (e.g., as shown in FIG. 4 through FIG. 7), and control the pixels of the display 806 using the generated pulse signal patterns (e.g., by supplying voltage signals conforming to the pulse signal patterns to individual pixels).

In some examples, the computing system 802 and/or display 806, including the modulation control system 804, are each implemented by a machine 1500 as described in FIG. 15 below. It will be appreciated that the computing system 802, modulation control system 804, communication link 808, and display 806 can be implemented using other suitable means in other examples.

Figure 9:
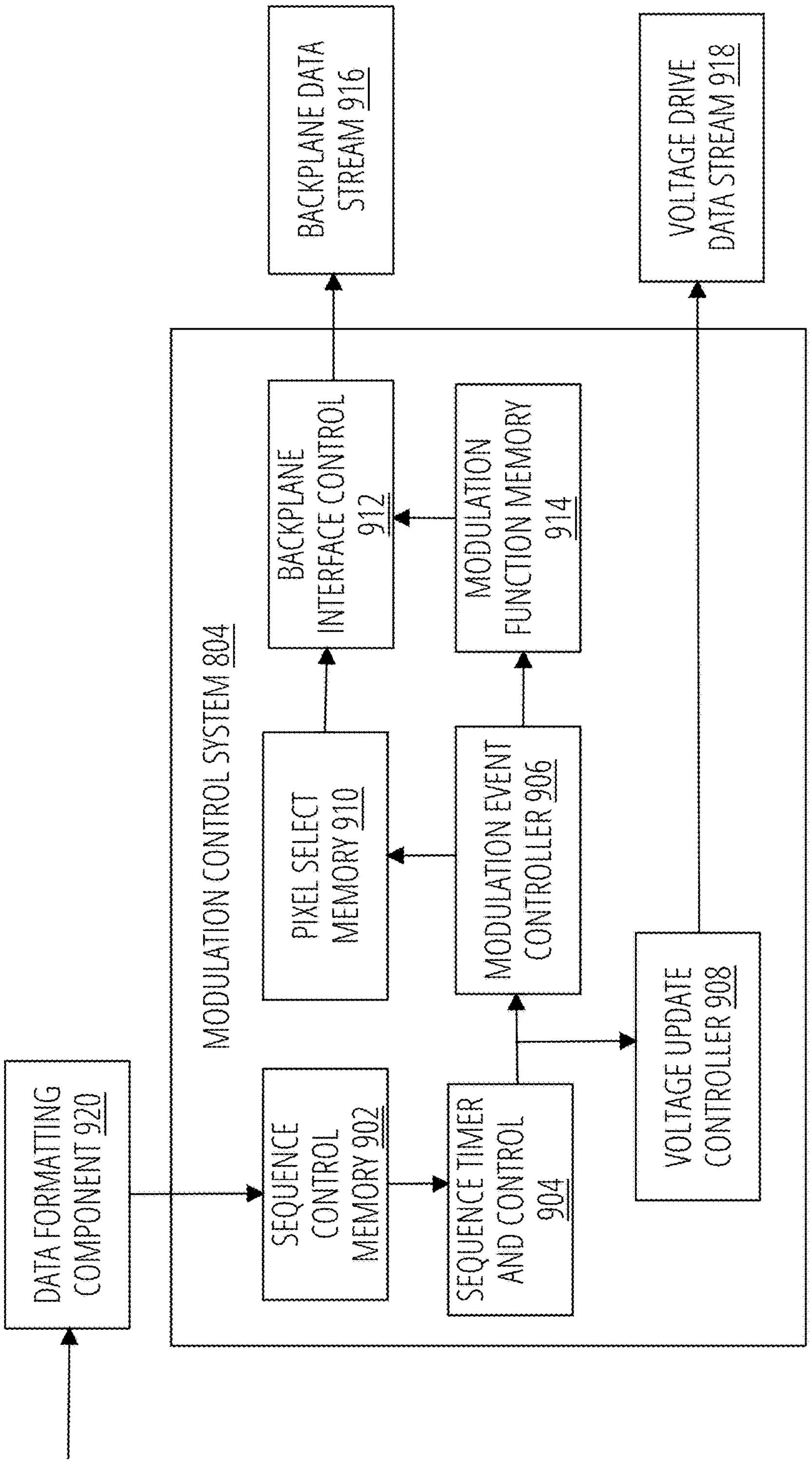
FIG. 9 is a block diagram of the example modulation control system of FIG. 8.

FIG. 9 is a block diagram of modulation control system 804 configured to generate binary encodings in accordance with various encoding schemes described herein. The modulation control system 804 may be part of a display 806 as described above. The display 806 or other system of which the modulation control system 804 is a part can include other functional components, such as a rendering component configured to determine desired grayscale values of pixels forming an image, a data formatting component 920 configured to extract and/or rearrange the pixel data combined with control data into a format supported by the modulation control system 804, and/or a transport component configured to transmit the data and control information to populate the memories in the modulation control system 804.

In some examples, the data formatting component 920 may be configured to receive a binary encoding (including n select bits and a dither bit) from the computing system 802 and separate the select bits from the dither bit, as needed, to generate an index to a Look-Up-Table (LUT) for each pixel. Example LUTs are described below with reference to FIG. 12 and FIG. 13. The data formatting component 920 provides the select and dither bits to the pixel select memory 910. The computing system 802 may pre-configure the sequence control memory 902, as well providing the definition of the LUT functions in the modulation function memory 914.

In some examples, the data formatting component 920 may be configured to receive from the computing system 802, the binary encoding data (including n select bits and a dither bit) to be loaded in the pixel select memory 910, the definition of the LUT functions to be loaded in the modulation function memory 914 and the command list to be loaded in the sequence control memory 902, for every frame.

The sequence control memory 902 contains a list of operations to be performed during each frame (or each sub-frame, such as a color sub-frame). Each operation has an associated time (also called a temporal location or temporal position within the frame time or the sub-frame time, such as during the illumination window 102) at which the operation is to be performed. In some examples, the sequence control memory 902 includes at least two operations, for example, at least one operation that initiates a modulation event, and at least one operation that initiates a voltage update event. A sequence timer and control 904 processes the list of operations in the sequence control memory 902, such that each operation is initiated at the indicated time in each frame (or sub-frame).

When a modulation event is initiated, a modulation event controller 906 controls the performance of that modulation event. When a voltage update event is initiated, a voltage update controller 908 is activated to control the performance of the voltage update event.

A modulation event controller 906 receives, from the sequence timer and control 904, a modulation index value (or simply a modulation start signal). The modulation event controller 906 increments the select value for the matching modulation index to indicate which LUT function is to be used for that modulation. Next, the modulation event controller 906 obtains or accesses a LUT function corresponding to the modulation index value from a modulation function memory 914 and sends the LUT function to LUT logic of the backplane interface control 912 to be used for controlling all pixels. The modulation event controller 906 also increments the select value through all index values across all of the pixels in the pixel select memory 910 to send them to the LUT logic of the backplane interface control 912. The backplane interface control 912 performs both processing of the LUT function and control of the pixels (by generating the backplane data stream 916).

Examples of LUTs used to implement the encoding schemes of FIG. 4 through FIG. 7 are described below with reference to FIG. 12 and FIG. 13. A bit produced for each pixel from the LUT logic (wherein an asserted or "on" value is denoted by 1, and a non-asserted or "off" value is denoted as 0) is further processed by the backplane interface control 912 to format the data as needed to send to the backplane (i.e., the circuitry propagating voltage signals to the individual pixels) as backplane data stream 916. The voltage update controller 908 sends the new target voltage for the $V_{common}$ supply (supplying a voltage level to the common electrode) or the $V_{pixel}$ supply (supplying the individual voltages to individual pixel electrodes), as indicated in the requested event, to the voltage driver as voltage drive data stream 918, according to a predetermined communication protocol.

The pulse signal patterns shown in FIG. 4 through FIG. 7 are translated into modulation events to be used, as implied, in modulation control and LUT 1008 (described below with reference to FIG. 10). The beginning and end of each modulation segment will be a modulation event (i.e., a change in modulation). A modulation profile or encoding scheme with t segments (e.g., 7 segments in the schemes of FIG. 4 and FIG. 5; 8 segments in the schemes of FIG. 6 and FIG. 7) will have t+1 modulation events. Thus, an encoding scheme with 8 segments will have 9 modulation events. In most color sequential display systems, the last modulation event will turn all pixels off to their relaxed state in order to provide some temporal isolation between color sub frames (e.g., allowing red illumination to relax before beginning a green color sub frame). These modulation events are then converted to a LUT format that may be stored in the modulation function memory 914 and applied in the LUT logic of the backplane interface control 912. It should be appreciated by one skilled in the art, that the modulation profile or encoding/decoding scheme could be implemented with different hardware architectures from a LUT memory and LUT logic, such as dedicated logic, counters, general instructions in a GPU, etc.

In some examples, in addition to modulation events, the pulse signal patterns may also be translated into inversion events for inverting the polarity of the LC field. To invert the LC field, both the pixel electrode and the common electrode voltages are inverted, without changing any pulse widths. In some such examples, the modulation event controller 906 may instead be a plane-load controller, and both modulation events and inversion events may be jointly referred to as "plane load events".

Figure 10:
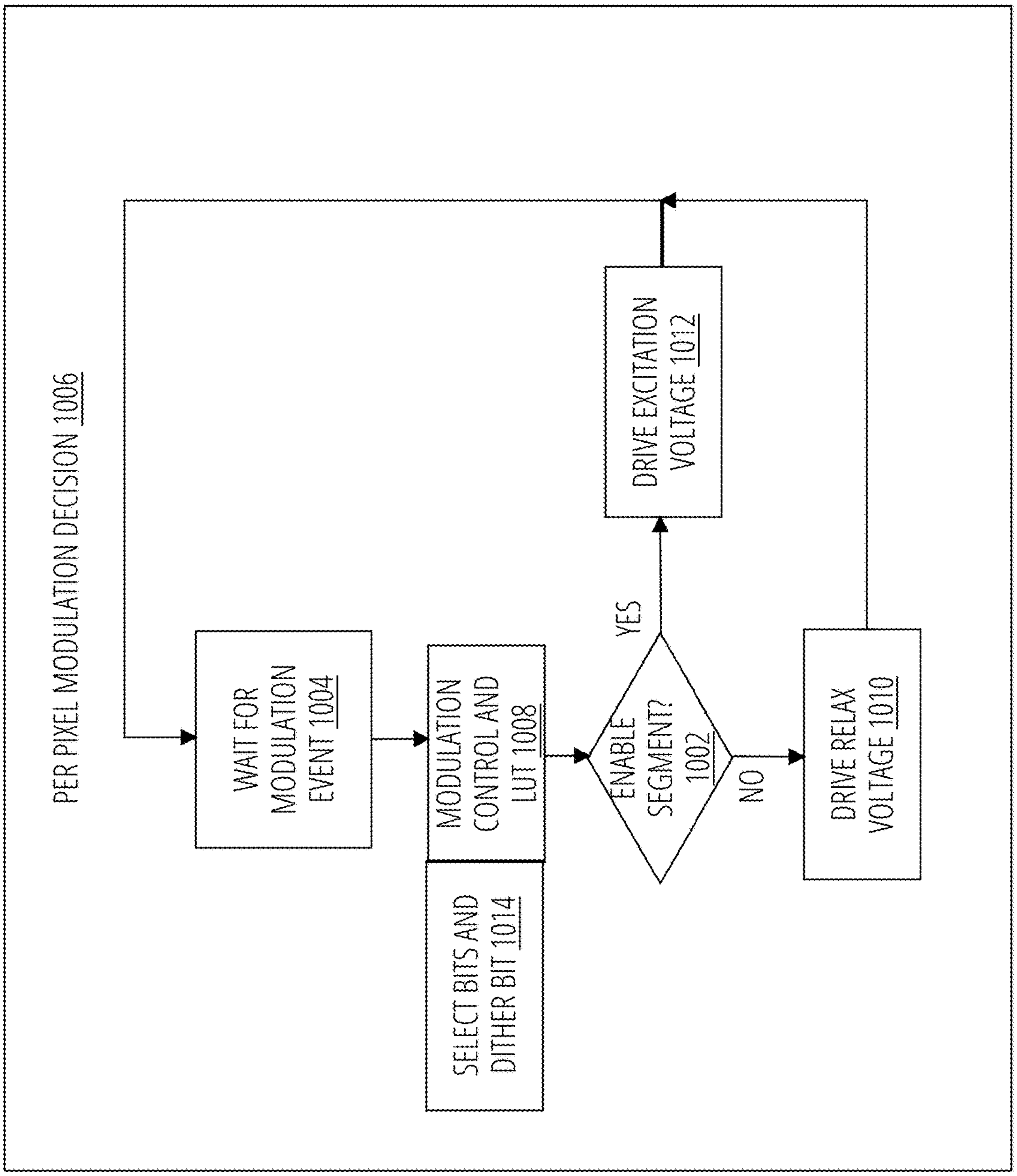
FIG. 10 is a flowchart illustrating the logical steps of a method for activating a modulation profile for each pixel of a display, according to some examples.

FIG. 10 is a flowchart that illustrates the logical steps of a method for activating a modulation profile for each pixel according to the sequence of LUT functions contained in the modulation function memory 914. The details of the modulation profile that select a specific modulation behavior (i.e. an encoding/decoding scheme for center aligned binary PWM sequences), are determined by the contents of the modulation function memory 914, as well as the number and spacing of the modulation events as contained in the sequence control memory 902. At operation 1004, the modulation control system 804 waits for a modulation event. Upon triggering of a modulation event, the select bits and dither bit 1014 are applied to the selected LUT function using the LUT logic of the backplane interface control 912 as executed by a modulation control and LUT operation 1008, to produce a single enable bit for the pending modulation segment. At decision element 1002, the system determines whether the segment is enabled (i.e., whether a pulse is active during the segment). If the segment is enabled (e.g., by a bit for that segment being asserted in the LUT row), the pixel electrode is driven to (or maintains) the excitation voltage at operation 1012, either continuously or momentarily, to drive the LC toward (or hold) the activated state as needed by the backplane. If the segment is not enabled (e.g., by a bit for that segment not being asserted in the LUT row), the pixel electrode is driven to (or maintains) the relaxation voltage at operation 1010, either continuously or momentarily, to drive the LC toward (or hold) the relaxed state as needed by the backplane.

When formulating the desired modulation pulse widths and locations (for centering) in the illumination window 102, the times for each modulation event of the base grayscale levels (for the native bit depth) are first selected to meet the desired gamma according to the response of the LC. These are entered into a modulation function and timing table for the base levels with no dither bit asserted. The corresponding PWM pulses for the base levels with the dither bit asserted are simply added to the table by extending each native pulse to the next modulation event in time. As described above, the pulse width of the dither extended select value x pulse and the non-extended pulse of the select value x+1 pulse should be the same width; when these pulses are not coincident in time, the corresponding leading and trailing segments are "paired". This puts additional constraints on the modulation event timing, and times must be adjusted to match segment durations for segments that are thus paired. If there is a significant difference in these paired segment durations, it may result in a non-monotonic grayscale response, which may be undesirable. There are multiple options for placement of the centered pulses, with pros and cons: a more perfectly centered low grayscale pulse increases the number of paired segments, but decreasing the number of paired segments results in the signal being less centered. These considerations are taken into account when selecting an encoding/decoding scheme with a lower number of segments (e.g., first example modulation scheme 400 or second example modulation scheme 500), or an encoding/decoding scheme with a larger number of segments but less centered pulses (e.g., third example modulation scheme 600 or fourth example modulation scheme 700).

Figure 11:
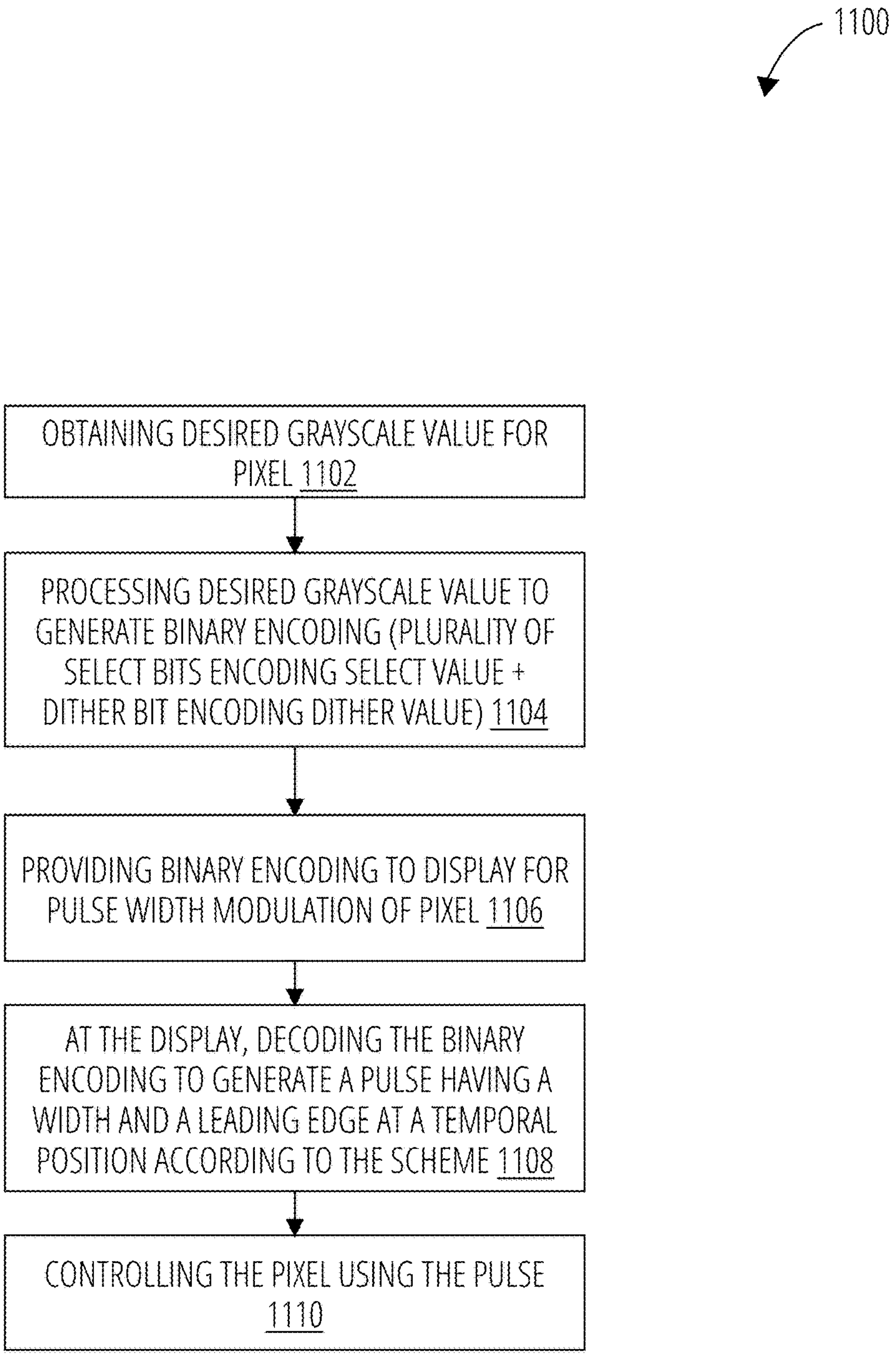
FIG. 11 illustrates a method for controlling pixels of a display using pulse width modulation, according to some examples.

FIG. 11 shows operations of an example method 1100. The method 1100 provides an example of how the binary encoding system 810 and/or modulation control system 804 cooperate to generate, transmit, receive, and decode binary encodings for controlling pixels of the display 806. Whereas the examples described herein implement the operations of method 1100 using the binary encoding system 810, modulation control system 804, display 806, and/or computing system 802 of FIG. 8, it will be appreciated that some example methods can be implemented using other suitable means.

Although the example method 1100 depicts a particular sequence of operations, the sequence may be altered without departing from the scope of the present disclosure. For example, some of the operations depicted may be performed in parallel or in a different sequence that does not materially affect the function of the method 1100. In other examples, different components of an example device or system that implements the method 1100 may perform functions at substantially the same time or in a specific sequence.

At operation 1102, a desired grayscale value for a pixel is obtained by the binary encoding system 810. At operation 1104, the desired grayscale value is processed by the binary encoding system 810 to generate the binary encoding, comprising a plurality of select bits encoding a select value and a dither bit encoding a dither value. At operation 1106, the binary encoding is provided to a display for pulse width modulation of the pixel. At operation 1108, the display (e.g., the modulation control system 804 of the display 806) receives the binary encoding and decodes the binary encoding to generate a pulse having a width and a leading edge at a temporal position according to the scheme. At operation 1110, the display (e.g. the modulation control system 804 of the display 806) controls the pixel using the pulse.

Figure 12:
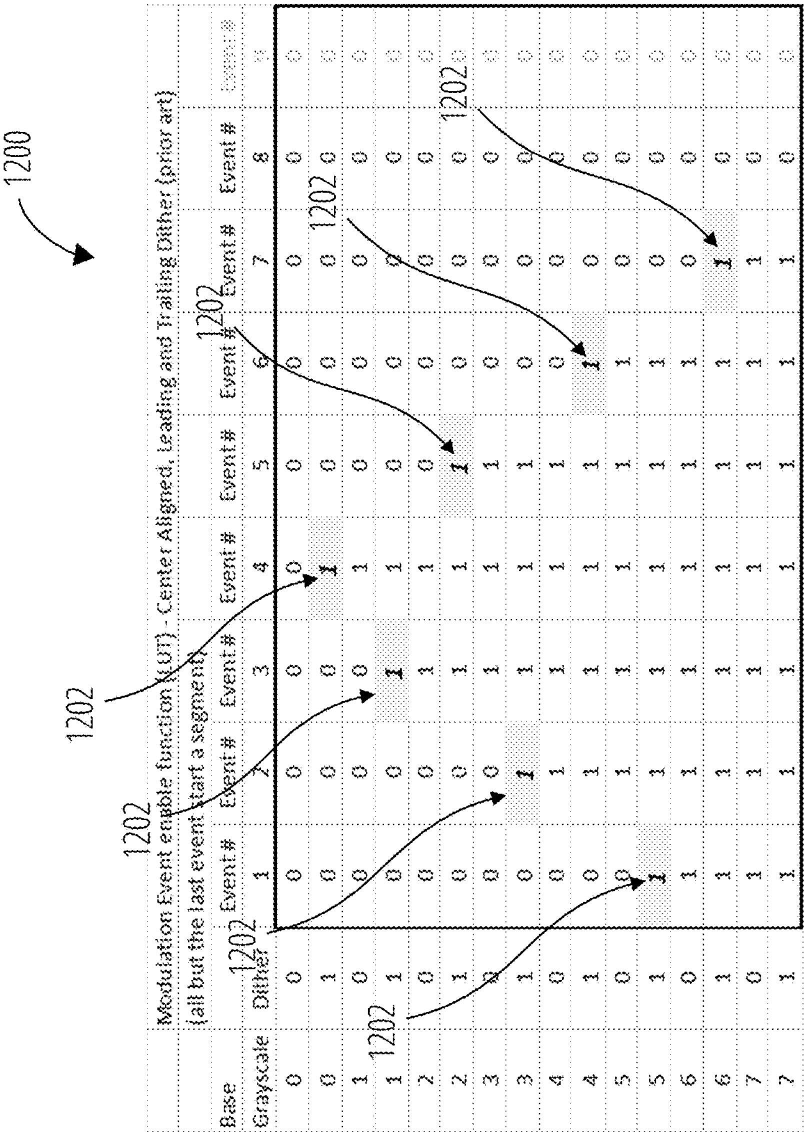
FIG. 12 illustrates an encoding of the conventional center aligned pulse signal patterns of FIG. 3 into a LUT function array with a dither bit behavior emphasized.

FIG. 12 shows a conventional center aligned scheme with dither behavior 1200, encoding the conventional center aligned pulse signal patterns of FIG. 3 into a LUT function array with a separate dither bit, thereby showing a LUT function array encompassing all 8 modulation events shown in FIG. 3. It will be appreciated that the pulse signal pattern for select value x with the dither bit asserted is the same as base level x+1 with no dither bit asserted, as a conventional system would have just added the dither bit to the base (with a limit to the max value). Added segments 1202 represent the portion of the pulses that change when the dither bit is asserted, which can be seen to be on both the leading and trailing edges for different base grayscale levels (i.e., different select values).

FIG. 13 is a LUT for third example modulation scheme 1300, encoding the signal patterns from the third example modulation scheme 600 from FIG. 6 into a LUT function array for all 9 modulation events shown in FIG. 6. The added segments 1302 created by asserting the dither bit extend the pulse only on the trailing edge.

To further reduce the residual artifacts at the boundary between some grayscale values from rising edge fringe field differences, a contour blending (CB) technique can be added to some examples described above. A scale factor may be used to multiply grayscale values when processing image data, thereby scaling the grayscale values according to the scale factor. Ordinarily, the scale factor is a fixed value used for all pixels (referred to herein as a Normal Scale Factor). However, contour blending is achieved by making slight changes to the scale factor over multiple frames, which results in moving the residual artifact (or any periodic artifact in gradients) to different locations in the image, thus spreading the effect and dimming its appearance in any one location. By changing the scale factor, the grayscale values corresponding to a pulse width and leading edge position encoded in the select bits and dither bit of the binary encoding may be scaled by a different amount in different frames. The contour blending approach changes the scale factor for each frame, resulting in a slightly altered grayscale value at each pixel, particularly with reference to the rounding method used when determining the scaled grayscale value. The number of frames for spreading or dimming is adjustable for different examples (e.g., over 2, 3, 4 or 5 frames, etc.). With a relatively high frame rate, more spreading may be tolerated without introducing a flickering effect. For example, at a 120 Hz frame rate, a 4-frame contour blending may provide 25% blending without flicker.

In some examples, the contour blending may occur over multiple sub-frames instead of multiple frames. (For the purposes of this disclosure, the term "frame" refers to a video frame, i.e., a pixel image formed on a display within an interval of time, and may also refer to a sub-frame unless otherwise specified.)

The amount of adjustment to the scale factor is also adjustable, but typically only the smallest adjustable increment of grayscale value (also called a least significant bit (LSB) of grayscale value) needs to be adjusted per step. For example, if 3 frames of blending are used, the adjustments to the scale would be (+1, 0, −1) LSB for the three frames, resulting in a net near zero change to each displayed pixel. Similarly, for 4 frames of blending, adjustments of +1, 0, −1, −2 LSB could be used, resulting in a net −0.5 LSB average change in grayscale value over the four frames. Special cases for the maximum or minimum grayscale values may be implemented in some examples to keep maximum values at the maximum and minimum values at the minimum, without wrapping in the number space (as described below). To minimize flicker, the complementary opposite adjustments should be paired together in adjacent frames (i.e. in a 5 frame blend of +2 to −2, the +2 and −2 should be in adjacent frames and the +1 and −1 should be in adjacent frames). This keeps intensity changes at the ½ frame rate; the averages for each adjacent pair of frames will be zero grayscale adjustment, except for a minor difference due to gamma. However, the artifact being blended will not be symmetric, so some examples may keep the total number of frames to a minimum to get the desired blending without adding flicker. In addition, blending over a larger number of frames may result in additional lower rate flicker due to the non-linear gamma impact on average grayscale values; for this reason, some examples use just the minimum number of frames for blending.

Figure 14:
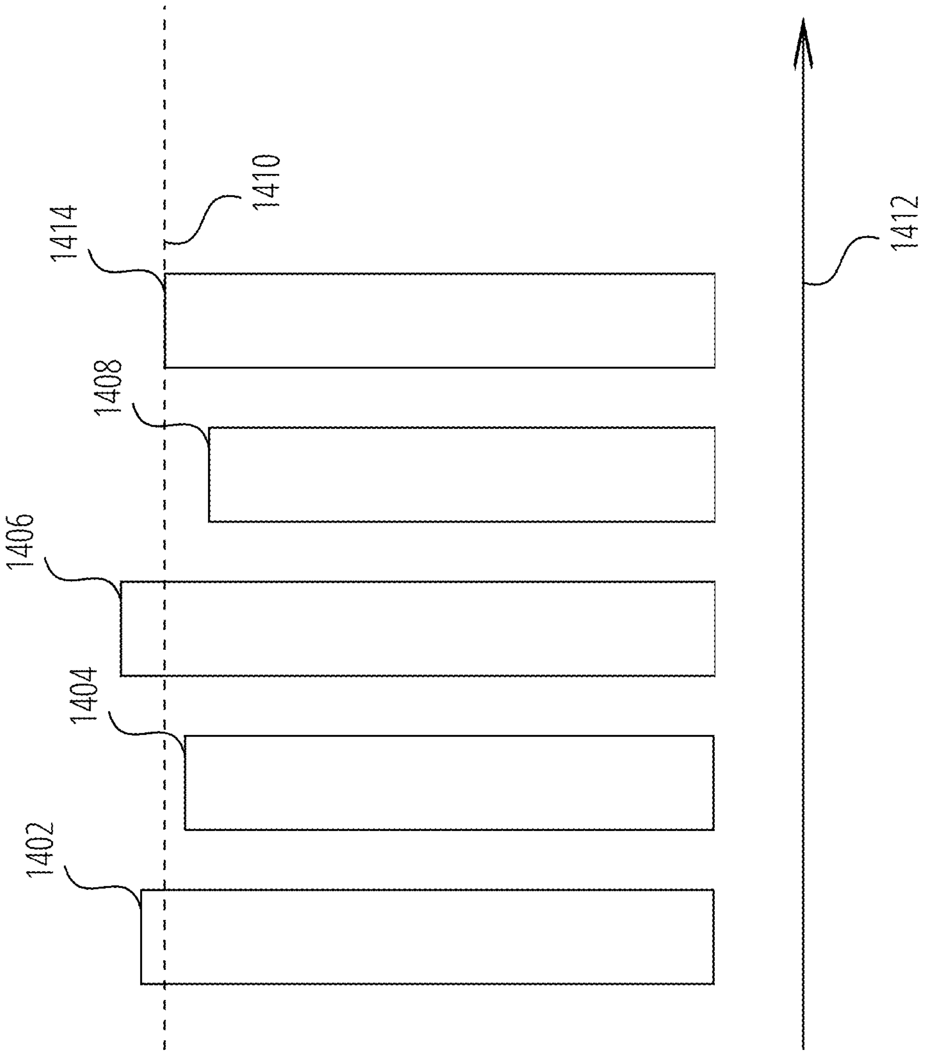
FIG. 14 illustrates an example of contour blending applied over a 5-frame sequence, according to some examples.

FIG. 14 shows an example of contour blending applied over a 5-frame sequence. A desired grayscale value (e.g., the Source Integer of the Contour Blending Rounding Table below, or its corresponding Source Float) is received, as in operation 1102 of method 1100. The desired grayscale value is then processed, at operation 1104 of method 1100, to generate a binary encoding corresponding to the desired grayscale value. If contour blending is used, then operation 1104 proceeds by several sub-steps. First, the Normal Scale Factor (e.g., a fixed scale factor applied by default) is determined. Second, depending on the number of frames to be used for contour blending and other factors described above, a set of Adjusted Scale Factors are generated, one for each frame, by adjusting the Normal Scale Factor. Third, the Adjusted Scale Factors are applied to the frames to scale the grayscale values of each frame, thereby generating scaled grayscale values (e.g., the Scaled Data of the Rounding Table) for the various frames, wherein the average of the scaled grayscale values of the frames (shown as average grayscale value 1410) is equal to or close to (e.g., within a single LSB value of) the desired grayscale value (e.g., the Source Integer) scaled by the Normal Scale Factor. In this example, a 5-frame contour blending technique is used, wherein the five frames are adjusted from the desired grayscale value by applying Scale Adjustment values to the desired grayscale value: the Scale Adjustment values for the five frames are +1 (reflected as the grayscale value for frame 1 1402 being slightly above the average grayscale value 1410), −1 (reflected as the grayscale value for frame 2 1404 being slightly below the average grayscale value 1410), +2 (reflected as the grayscale value for frame 3 1406 being slightly above the value for frame 1 1402), −2 (reflected as the grayscale value for frame 4 1408 being slightly below the value for frame 2 1404), and 0 (reflected as the grayscale value for frame 5 1414 being equal to the average grayscale value 1410). The five frames includes two pairs of frames (i.e., 1402 and 1404, and 1406 and 1408) in which each frame of the pair is offset from the desired grayscale value by the same amount, one negative and one positive. Each such pair of frames is located temporally adjacent to each other in the sequence for the reasons described above. It will be appreciated that, when ordered by their scaled grayscale values, the five frames have scaled grayscale values that are within one LSB unit of their adjacent scaled grayscale values: in this example, the scale adjustment values in order are −2, −1, 0, +1, +2.

In a second sub-step of operation 1104, after the scaled grayscale values are determined for each frame in the sequence, each scaled grayscale value is mapped to a binary encoding (e.g., select bit values and a dither bit value) corresponding to the scaled grayscale value. The binary encodings thus generated are then sent to the display, decoded, and used to control the pixel during each of the corresponding frames during operations 1106, 1008, and 1110 of method 1100.

In a second sub-step of operation 1104, after the scaled grayscale values are determined for each frame in the sequence, each scaled grayscale value is mapped to a binary encoding corresponding to the scaled grayscale value. The binary encodings thus generated are then sent to the display, decoded, and used to control the pixel during each of the corresponding frames during operations 1106, 1008, and 1110 of method 1100.

It will be appreciated that, in conventional image processing, pixel data is represented in floating point format during operations and then converted or scaled to an integer representation with a bit-depth matching the capability of the display (or the current mode of the display). A scaling multiplication is typically performed on each color of every pixel as part of that final data formatting. In some examples, the contour blending techniques described herein simply replace the scaling factor used in the conventional scaling multiplication operation with an altered scale factor for each frame. In some cases, an input image may already have the pixels in a fixed bit-depth integer representation; in such cases, a scaling division can be applied to convert to floating point format before the data processing alterations are made. For example, when the floating point data range is from 0.0 to 1.0, and the data bit-depth of the display is 8 bits per primary color, the normal scale value would be 255. A four frame blend could use the select values: 256, 255, 254, 253 over four adjacent frames, thereby achieving an average grayscale value of 254.5, which is within one select value unit of the target select value of 255. In keeping with the balanced pair issue described above, the temporal order of the four select values assigned to the four frames could be: 255 (i.e., average select value +0.5), 254 (i.e., average select value −0.5), 256 (i.e., average select value +1.5), 253 (i.e., average select value −1.5). Other possible orders consistent with the techniques described above are (253, 254, 255, 256), (253, 256, 254, 255), (253, 256, 255, 254), etc. However, it may be preferable to avoid select values that are arranged to include two positive offsets adjacent to each other (e.g., 255 followed by 256), as this may increase delta and result in noticeable flicker. Thus, of the three example orders above, those without adjacent positive offsets may be preferable: e.g., (255, 254, 256, 253) or (253, 256, 254, 255).

However, the resulting integer generated by the scaling operation depends on the rounding method used when converting from an integer to a floating point value and back to an integer value (source imagery often starts as 8-bits per color). In some examples, the truncation method of rounding is used, and scale factors below the normal scale factor (e.g., −1 or −2) result in the expected/desired change to the data, but scale factors above the normal scale factor get lost in the rounding. To compensate, the scale adjustments may be applied in floating point format, and positive adjustments to the scale factor may use an additional adjustment slightly below 1.0 to bias the rounding in order to make the desired change to the data (e.g., instead of +1, use +1.995). The contour blending rounding table below provides examples of adjustments that can be used for biasing the rounding operation in some examples.

In the contour blending rounding table, the Source Integer indicates the input value of the integer (e.g., a desired grayscale value) between 0 and 255; the Source Float indicates the corresponding floating point value between 0.0 and 1.0; the various Scale Adjustment values indicate adjustments to the select value in each frame of a multi-frame contour blending frame sequence; and the Scaled Data values indicate the output of the scaling operation performed on the Source Integer as modified by the Scale Adjustment after truncation-based rounding. In some examples, only four of the Scale Adjustment columns are used: for example, the "1.995" Scale Adjustment column may be used in place of the "1" Scale Adjustment column: due to the operation of rounding via truncation used in some systems, a value higher than +1 and approaching +2 may be used to ensure that the value is incremented instead of truncated downward to duplicate the output of the "0" Scale Adjustment column (as may be seen by the equal values of the Scaled Data in the "0" and "1" Scale Adjustment columns). It will be appreciated that some examples may use a value other than 1.995, such as a value higher than 1 but lower than 2; however, 1.995 is provided as an example because it approximates the level of precision needed for the scaled data (i.e., 0.995 is approximately 254/255).

Contour Blending Rounding Table
Contour Blending rounding check, using truncation:

| | | 255 Scale Adjustment | | | | |
|---|---|---|---|---|---|---|
| Normal scale factor: | | 1 | 1.995 | 0 | −1 | −2 |
| Source Integer | Source Float | Scaled Data | | | | |
| 255 | 1.0000 | 256 | 256 | 255 | 254 | 253 |
| 254 | 0.9961 | 254 | 255 | 254 | 253 | 252 |
| 253 | 0.9922 | 253 | 254 | 253 | 252 | 251 |
| 252 | 0.9882 | 252 | 253 | 252 | 251 | 250 |
| 251 | 0.9843 | 251 | 252 | 251 | 250 | 249 |
| 250 | 0.9804 | 250 | 251 | 250 | 249 | 248 |
| 249 | 0.9765 | 249 | 250 | 249 | 248 | 247 |
| 248 | 0.9725 | 248 | 249 | 248 | 247 | 246 |
| 247 | 0.9686 | 247 | 248 | 247 | 246 | 245 |
| 246 | 0.9647 | 246 | 247 | 246 | 245 | 244 |
| 245 | 0.9608 | 245 | 246 | 245 | 244 | 243 |
| 244 | 0.9569 | 244 | 245 | 244 | 243 | 242 |
| 243 | 0.9529 | 243 | 244 | 243 | 242 | 241 |
| 242 | 0.9490 | 242 | 243 | 242 | 241 | 240 |
| 241 | 0.9451 | 241 | 242 | 241 | 240 | 239 |
| 240 | 0.9412 | 240 | 241 | 240 | 239 | 238 |
| 239 | 0.9373 | 239 | 240 | 239 | 238 | 237 |
| 238 | 0.9333 | 238 | 239 | 238 | 237 | 236 |
| 237 | 0.9294 | 237 | 238 | 237 | 236 | 235 |
| 236 | 0.9255 | 236 | 237 | 236 | 235 | 234 |
| 235 | 0.9216 | 235 | 236 | 235 | 234 | 233 |
| 234 | 0.9176 | 234 | 235 | 234 | 233 | 232 |
| 233 | 0.9137 | 233 | 234 | 233 | 232 | 231 |
| 232 | 0.9098 | 232 | 233 | 232 | 231 | 230 |
| 231 | 0.9059 | 231 | 232 | 231 | 230 | 229 |
| 230 | 0.9020 | 230 | 231 | 230 | 229 | 228 |
| 229 | 0.8980 | 229 | 230 | 229 | 228 | 227 |
| 228 | 0.8941 | 228 | 229 | 228 | 227 | 226 |
| 227 | 0.8902 | 227 | 228 | 227 | 226 | 225 |
| 226 | 0.8863 | 226 | 227 | 226 | 225 | 224 |
| 225 | 0.8824 | 225 | 226 | 225 | 224 | 223 |
| 224 | 0.8784 | 224 | 225 | 224 | 223 | 222 |
| 223 | 0.8745 | 223 | 224 | 223 | 222 | 221 |
| 222 | 0.8706 | 222 | 223 | 222 | 221 | 220 |
| 221 | 0.8667 | 221 | 222 | 221 | 220 | 219 |
| 220 | 0.8627 | 220 | 221 | 220 | 219 | 218 |
| 219 | 0.8588 | 219 | 220 | 219 | 218 | 217 |
| 218 | 0.8549 | 218 | 219 | 218 | 217 | 216 |
| 217 | 0.8510 | 217 | 218 | 217 | 216 | 215 |
| 216 | 0.8471 | 216 | 217 | 216 | 215 | 214 |
| 215 | 0.8431 | 215 | 216 | 215 | 214 | 213 |
| 214 | 0.8392 | 214 | 215 | 214 | 213 | 212 |
| 213 | 0.8353 | 213 | 214 | 213 | 212 | 211 |
| 212 | 0.8314 | 212 | 213 | 212 | 211 | 210 |
| 211 | 0.8275 | 211 | 212 | 211 | 210 | 209 |

-continued

Contour Blending Rounding Table
Contour Blending rounding check, using truncation:

| | | 255 Scale Adjustment | | | | |
|---|---|---|---|---|---|---|
| Normal scale factor: | | 1 | 1.995 | 0 | −1 | −2 |
| Source Integer | Source Float | Scaled Data | | | | |
| 210 | 0.8235 | 210 | 211 | 210 | 209 | 208 |
| 209 | 0.8196 | 209 | 210 | 209 | 208 | 207 |
| 208 | 0.8157 | 208 | 209 | 208 | 207 | 206 |
| 207 | 0.8118 | 207 | 208 | 207 | 206 | 205 |
| 206 | 0.8078 | 206 | 207 | 206 | 205 | 204 |
| 205 | 0.8039 | 205 | 206 | 205 | 204 | 203 |
| 204 | 0.8000 | 204 | 205 | 204 | 203 | 202 |
| 203 | 0.7961 | 203 | 204 | 203 | 202 | 201 |
| 202 | 0.7922 | 202 | 203 | 202 | 201 | 200 |
| 201 | 0.7882 | 201 | 202 | 201 | 200 | 199 |
| 200 | 0.7843 | 200 | 201 | 200 | 199 | 198 |
| 199 | 0.7804 | 199 | 200 | 199 | 198 | 197 |
| 198 | 0.7765 | 198 | 199 | 198 | 197 | 196 |
| 197 | 0.7725 | 197 | 198 | 197 | 196 | 195 |
| 196 | 0.7686 | 196 | 197 | 196 | 195 | 194 |
| 195 | 0.7647 | 195 | 196 | 195 | 194 | 193 |
| 194 | 0.7608 | 194 | 195 | 194 | 193 | 192 |
| 193 | 0.7569 | 193 | 194 | 193 | 192 | 191 |
| 192 | 0.7529 | 192 | 193 | 192 | 191 | 190 |
| 191 | 0.7490 | 191 | 192 | 191 | 190 | 189 |
| 190 | 0.7451 | 190 | 191 | 190 | 189 | 188 |
| 189 | 0.7412 | 189 | 190 | 189 | 188 | 187 |
| 188 | 0.7373 | 188 | 189 | 188 | 187 | 186 |
| 187 | 0.7333 | 187 | 188 | 187 | 186 | 185 |
| 186 | 0.7294 | 186 | 187 | 186 | 185 | 184 |
| 185 | 0.7255 | 185 | 186 | 185 | 184 | 183 |
| 184 | 0.7216 | 184 | 185 | 184 | 183 | 182 |
| 183 | 0.7176 | 183 | 184 | 183 | 182 | 181 |
| 182 | 0.7137 | 182 | 183 | 182 | 181 | 180 |
| 181 | 0.7098 | 181 | 182 | 181 | 180 | 179 |
| 180 | 0.7059 | 180 | 181 | 180 | 179 | 178 |
| 179 | 0.7020 | 179 | 180 | 179 | 178 | 177 |
| 178 | 0.6980 | 178 | 179 | 178 | 177 | 176 |
| 177 | 0.6941 | 177 | 178 | 177 | 176 | 175 |
| 176 | 0.6902 | 176 | 177 | 176 | 175 | 174 |
| 175 | 0.6863 | 175 | 176 | 175 | 174 | 173 |
| 174 | 0.6824 | 174 | 175 | 174 | 173 | 172 |
| 173 | 0.6784 | 173 | 174 | 173 | 172 | 171 |
| 172 | 0.6745 | 172 | 173 | 172 | 171 | 170 |
| 171 | 0.6706 | 171 | 172 | 171 | 170 | 169 |
| 170 | 0.6667 | 170 | 171 | 170 | 169 | 168 |
| 169 | 0.6627 | 169 | 170 | 169 | 168 | 167 |
| 168 | 0.6588 | 168 | 169 | 168 | 167 | 166 |
| 167 | 0.6549 | 167 | 168 | 167 | 166 | 165 |
| 166 | 0.6510 | 166 | 167 | 166 | 165 | 164 |
| 165 | 0.6471 | 165 | 166 | 165 | 164 | 163 |
| 164 | 0.6431 | 164 | 165 | 164 | 163 | 162 |
| 163 | 0.6392 | 163 | 164 | 163 | 162 | 161 |
| 162 | 0.6353 | 162 | 163 | 162 | 161 | 160 |
| 161 | 0.6314 | 16 | 162 | 16 | 160 | 159 |
| 160 | 0.6275 | 160 | 161 | 160 | 159 | 158 |
| 159 | 0.6235 | 159 | 160 | 159 | 158 | 157 |
| 158 | 0.6196 | 158 | 159 | 158 | 157 | 156 |
| 157 | 0.6157 | 157 | 158 | 157 | 156 | 155 |
| 156 | 0.6118 | 156 | 157 | 156 | 155 | 154 |
| 155 | 0.6078 | 155 | 156 | 155 | 154 | 153 |
| 154 | 0.6039 | 154 | 155 | 154 | 153 | 152 |
| 153 | 0.6000 | 153 | 154 | 153 | 152 | 151 |
| 152 | 0.5961 | 152 | 153 | 152 | 151 | 150 |
| 151 | 0.5922 | 151 | 152 | 15 | 150 | 149 |
| 150 | 0.5882 | 150 | 151 | 150 | 149 | 148 |
| 149 | 0.5843 | 149 | 150 | 149 | 148 | 147 |
| 148 | 0.5804 | 148 | 149 | 148 | 147 | 146 |
| 147 | 0.5765 | 147 | 148 | 147 | 146 | 145 |
| 146 | 0.5725 | 146 | 147 | 146 | 145 | 144 |
| 145 | 0.5686 | 145 | 146 | 145 | 144 | 143 |
| 144 | 0.5647 | 144 | 145 | 144 | 143 | 142 |
| 143 | 0.5608 | 143 | 144 | 143 | 142 | 141 |
| 142 | 0.5569 | 142 | 143 | 142 | 141 | 140 |

-continued

| Contour Blending Rounding Table<br>Contour Blending rounding check, using truncation: | | | | | | |
|---|---|---|---|---|---|---|
| | | 255 Scale Adjustment | | | | |
| Normal scale factor: | | 1 | 1.995 | 0 | −1 | −2 |
| Source Integer | Source Float | Scaled Data | | | | |
| 141 | 0.5529 | 141 | 142 | 141 | 140 | 139 |
| 140 | 0.5490 | 140 | 141 | 140 | 139 | 138 |
| 139 | 0.5451 | 139 | 140 | 139 | 138 | 137 |
| 138 | 0.5412 | 138 | 139 | 138 | 137 | 136 |
| 137 | 0.5373 | 137 | 138 | 137 | 136 | 135 |
| 136 | 0.5333 | 136 | 137 | 136 | 135 | 134 |
| 135 | 0.5294 | 135 | 136 | 135 | 134 | 133 |
| 134 | 0.5255 | 134 | 135 | 134 | 133 | 132 |
| 133 | 0.5216 | 133 | 134 | 133 | 132 | 131 |
| 132 | 0.5176 | 132 | 133 | 132 | 131 | 130 |
| 131 | 0.5137 | 131 | 132 | 131 | 130 | 129 |
| 130 | 0.5098 | 130 | 131 | 130 | 129 | 128 |
| 129 | 0.5059 | 129 | 130 | 129 | 128 | 127 |
| 128 | 0.5020 | 128 | 129 | 128 | 127 | 126 |
| 127 | 0.4980 | 127 | 127 | 127 | 126 | 126 |
| 126 | 0.4941 | 126 | 126 | 126 | 125 | 125 |
| 125 | 0.4902 | 125 | 125 | 125 | 124 | 124 |
| 124 | 0.4863 | 124 | 124 | 124 | 123 | 123 |
| 123 | 0.4824 | 123 | 123 | 123 | 122 | 122 |
| 122 | 0.4784 | 122 | 122 | 122 | 121 | 121 |
| 121 | 0.4745 | 121 | 121 | 121 | 120 | 120 |
| 120 | 0.4706 | 120 | 120 | 120 | 119 | 119 |
| 119 | 0.4667 | 119 | 119 | 119 | 118 | 118 |
| 118 | 0.4627 | 118 | 118 | 118 | 117 | 117 |
| 117 | 0.4588 | 117 | 117 | 117 | 116 | 116 |
| 116 | 0.4549 | 116 | 116 | 116 | 115 | 115 |
| 115 | 0.4510 | 115 | 115 | 115 | 114 | 114 |
| 114 | 0.4471 | 114 | 114 | 114 | 113 | 113 |
| 113 | 0.4431 | 113 | 113 | 113 | 112 | 112 |
| 112 | 0.4392 | 112 | 112 | 112 | 111 | 111 |
| 111 | 0.4353 | 111 | 111 | 111 | 110 | 110 |
| 110 | 0.4314 | 110 | 110 | 110 | 109 | 109 |
| 109 | 0.4275 | 109 | 109 | 109 | 108 | 108 |
| 108 | 0.4235 | 108 | 108 | 108 | 107 | 107 |
| 107 | 0.4196 | 107 | 107 | 107 | 106 | 106 |
| 106 | 0.4157 | 106 | 106 | 106 | 105 | 105 |
| 105 | 0.4118 | 105 | 105 | 105 | 104 | 104 |
| 104 | 0.4078 | 104 | 104 | 104 | 103 | 103 |
| 103 | 0.4039 | 103 | 103 | 103 | 102 | 102 |
| 102 | 0.4000 | 102 | 102 | 102 | 10 | 101 |
| 101 | 0.3961 | 101 | 101 | 101 | 100 | 100 |
| 100 | 0.3922 | 100 | 100 | 100 | 99 | 99 |
| 99 | 0.3882 | 99 | 99 | 99 | 98 | 98 |
| 98 | 0.3843 | 98 | 98 | 98 | 97 | 97 |
| 97 | 0.3804 | 97 | 97 | 97 | 96 | 96 |
| 96 | 0.3765 | 96 | 96 | 96 | 95 | 95 |
| 95 | 0.3725 | 95 | 95 | 95 | 94 | 94 |
| 94 | 0.3686 | 94 | 94 | 94 | 93 | 93 |
| 93 | 0.3647 | 93 | 93 | 93 | 92 | 92 |
| 92 | 0.3608 | 92 | 92 | 92 | 91 | 91 |
| 91 | 0.3569 | 91 | 91 | 91 | 90 | 90 |
| 90 | 0.3529 | 90 | 90 | 90 | 89 | 89 |
| 89 | 0.3490 | 89 | 89 | 89 | 88 | 88 |
| 88 | 0.3451 | 88 | 88 | 88 | 87 | 87 |
| 87 | 0.3412 | 87 | 87 | 87 | 86 | 86 |
| 86 | 0.3373 | 86 | 86 | 86 | 85 | 85 |
| 85 | 0.3333 | 85 | 85 | 85 | 84 | 84 |
| 84 | 0.3294 | 84 | 84 | 84 | 83 | 83 |
| 83 | 0.3255 | 83 | 83 | 83 | 82 | 82 |
| 82 | 0.3216 | 82 | 82 | 82 | 81 | 81 |
| 81 | 0.3176 | 81 | 81 | 81 | 80 | 80 |
| 80 | 0.3137 | 80 | 80 | 80 | 79 | 79 |
| 79 | 0.3098 | 79 | 79 | 79 | 78 | 78 |
| 78 | 0.3059 | 78 | 78 | 78 | 77 | 77 |
| 77 | 0.3020 | 77 | 77 | 77 | 76 | 76 |
| 76 | 0.2980 | 76 | 76 | 76 | 75 | 75 |
| 75 | 0.2941 | 75 | 75 | 75 | 74 | 74 |
| 74 | 0.2902 | 74 | 74 | 74 | 73 | 73 |
| 73 | 0.2863 | 73 | 73 | 73 | 72 | 72 |

-continued

| Contour Blending Rounding Table<br>Contour Blending rounding check, using truncation: | | | | | | |
|---|---|---|---|---|---|---|
| | | 255 Scale Adjustment | | | | |
| Normal scale factor: | | 1 | 1.995 | 0 | −1 | −2 |
| Source Integer | Source Float | Scaled Data | | | | |
| 72 | 0.2824 | 72 | 72 | 72 | 71 | 71 |
| 71 | 0.2784 | 71 | 71 | 71 | 70 | 70 |
| 70 | 0.2745 | 70 | 70 | 70 | 69 | 69 |
| 69 | 0.2706 | 69 | 69 | 69 | 68 | 68 |
| 68 | 0.2667 | 68 | 68 | 68 | 67 | 67 |
| 67 | 0.2627 | 67 | 67 | 67 | 66 | 66 |
| 66 | 0.2588 | 66 | 66 | 66 | 65 | 65 |
| 65 | 0.2549 | 65 | 65 | 65 | 64 | 64 |
| 64 | 0.2510 | 64 | 64 | 64 | 63 | 63 |
| 63 | 0.2471 | 63 | 63 | 63 | 62 | 62 |
| 62 | 0.2431 | 62 | 62 | 62 | 61 | 61 |
| 61 | 0.2392 | 61 | 61 | 61 | 60 | 60 |
| 60 | 0.2353 | 60 | 60 | 60 | 59 | 59 |
| 59 | 0.2314 | 59 | 59 | 59 | 58 | 58 |
| 58 | 0.2275 | 58 | 58 | 58 | 57 | 57 |
| 57 | 0.2235 | 57 | 57 | 57 | 56 | 56 |
| 56 | 0.2196 | 56 | 56 | 56 | 55 | 55 |
| 55 | 0.2157 | 55 | 55 | 55 | 54 | 54 |
| 54 | 0.2118 | 54 | 54 | 54 | 53 | 53 |
| 53 | 0.2078 | 53 | 53 | 53 | 52 | 52 |
| 52 | 0.2039 | 52 | 52 | 52 | 51 | 51 |
| 51 | 0.2000 | 51 | 51 | 51 | 50 | 50 |
| 50 | 0.1961 | 50 | 50 | 50 | 49 | 49 |
| 49 | 0.1922 | 49 | 49 | 49 | 48 | 48 |
| 48 | 0.1882 | 48 | 48 | 48 | 47 | 47 |
| 47 | 0.1843 | 47 | 47 | 47 | 46 | 46 |
| 46 | 0.1804 | 46 | 46 | 46 | 45 | 45 |
| 45 | 0.1765 | 45 | 45 | 45 | 44 | 44 |
| 44 | 0.1725 | 44 | 44 | 44 | 43 | 43 |
| 43 | 0.1686 | 43 | 43 | 43 | 42 | 42 |
| 42 | 0.1647 | 42 | 42 | 42 | 41 | 41 |
| 41 | 0.1608 | 41 | 41 | 41 | 40 | 40 |
| 40 | 0.1569 | 40 | 40 | 40 | 39 | 39 |
| 39 | 0.1529 | 39 | 39 | 39 | 38 | 38 |
| 38 | 0.1490 | 38 | 38 | 38 | 37 | 37 |
| 37 | 0.1451 | 37 | 37 | 37 | 36 | 36 |
| 36 | 0.1412 | 36 | 36 | 36 | 35 | 35 |
| 35 | 0.1373 | 35 | 35 | 35 | 34 | 34 |
| 34 | 0.1333 | 34 | 34 | 34 | 33 | 33 |
| 33 | 0.1294 | 33 | 33 | 33 | 32 | 32 |
| 32 | 0.1255 | 32 | 32 | 32 | 31 | 31 |
| 31 | 0.1216 | 31 | 31 | 31 | 30 | 30 |
| 30 | 0.1176 | 30 | 30 | 30 | 29 | 29 |
| 29 | 0.1137 | 29 | 29 | 29 | 28 | 28 |
| 28 | 0.1098 | 28 | 28 | 28 | 27 | 27 |
| 27 | 0.1059 | 27 | 27 | 27 | 26 | 26 |
| 26 | 0.1020 | 26 | 26 | 26 | 25 | 25 |
| 25 | 0.0980 | 25 | 25 | 25 | 24 | 24 |
| 24 | 0.0941 | 24 | 24 | 24 | 23 | 23 |
| 23 | 0.0902 | 23 | 23 | 23 | 22 | 22 |
| 22 | 0.0863 | 22 | 22 | 22 | 21 | 21 |
| 21 | 0.0824 | 21 | 21 | 21 | 20 | 20 |
| 20 | 0.0784 | 20 | 20 | 20 | 19 | 19 |
| 19 | 0.0745 | 19 | 19 | 19 | 18 | 18 |
| 18 | 0.0706 | 18 | 18 | 18 | 17 | 17 |
| 17 | 0.0667 | 17 | 17 | 17 | 16 | 16 |
| 16 | 0.0627 | 16 | 16 | 16 | 15 | 15 |
| 15 | 0.0588 | 15 | 15 | 15 | 14 | 14 |
| 14 | 0.0549 | 14 | 14 | 14 | 13 | 13 |
| 13 | 0.0510 | 13 | 13 | 13 | 12 | 12 |
| 12 | 0.0471 | 12 | 12 | 12 | 11 | 11 |
| 11 | 0.0431 | 11 | 11 | 11 | 10 | 10 |
| 10 | 0.0392 | 10 | 10 | 10 | 9 | 9 |
| 9 | 0.0353 | 9 | 9 | 9 | 8 | 8 |
| 8 | 0.0314 | 8 | 8 | 8 | 7 | 7 |
| 7 | 0.0275 | 7 | 7 | 7 | 6 | 6 |
| 6 | 0.0235 | 6 | 6 | 6 | 5 | 5 |
| 5 | 0.0196 | 5 | 5 | 5 | 4 | 4 |
| 4 | 0.0157 | 4 | 4 | 4 | 3 | 3 |

-continued

Contour Blending Rounding Table
Contour Blending rounding check, using truncation:

| | | 255 Scale Adjustment | | | | |
|---|---|---|---|---|---|---|
| Normal scale factor: | | 1 | 1.995 | 0 | −1 | −2 |
| Source Integer | Source Float | Scaled Data | | | | |
| 3 | 0.0118 | 3 | 3 | 3 | 2 | 2 |
| 2 | 0.0078 | 2 | 2 | 2 | 1 | 1 |
| 1 | 0.0039 | 1 | 1 | 1 | 0 | 0 |
| 0 | 0.0000 | 0 | 0 | 0 | 0 | 0 |

In some examples, when processing grayscale values near the maximum grayscale value, the positive scaling results in saturation because the grayscale value can't go above the maximum grayscale value; thus, the negative adjusted scaling would be one sided without compensation from corresponding positive scaling. This may result in flicker and/or an undesired attenuation in maximum illumination. To address this issue, some examples may detect when the input (e.g., the Source Integer or desired grayscale value) is at or near the maximum (e.g., when the desired grayscale value is within the largest positive adjustment of the maximum grayscale value for desired adjustments of more than +1). If such a case is detected for some set of pixels, contour blending may not be performed for these pixels in some such examples. It will be appreciated that the visual artifacts that contour blending is intended to address usually do not affect pixels at or near the maximum grayscale value, so contour blending may not be needed for those pixels in any event.

Such selective omission of contour blending for pixels having a desired grayscale value near the maximum grayscale value, in combination with trailing dither techniques described above, may exhibit further beneficial effects in some examples. The supplemental modulation segment added at the end of the illumination window 102 (e.g., segment #8 608 or 706 in FIG. 6 or FIG. 7) may result in a dither bit being asserted to increase the grayscale value above the maximum native grayscale value. Conventional spatial dithering algorithms for a maximum grayscale value would not assert a dither bit for all pixels, thus resulting in some attenuation of the maximum brightness of the display, compared to when all pixels have their dither bit asserted. To account for this case, some examples may detect when a maximum grayscale value is specified by the desired grayscale value in the input data, and in such a case perform two modifications to the modulation schemes described herein: first, contour blending is omitted in such cases, and second, the encoding/decoding scheme (e.g., as shown in one of FIG. 4 through FIG. 7) can be modified to assert the dither bit for all pixels, thus restoring the maximum brightness of the display. This may cause a slight deviation from the gamma curve, but the increased brightness may be preferred for some examples.

Machine Architecture

Figure 15:
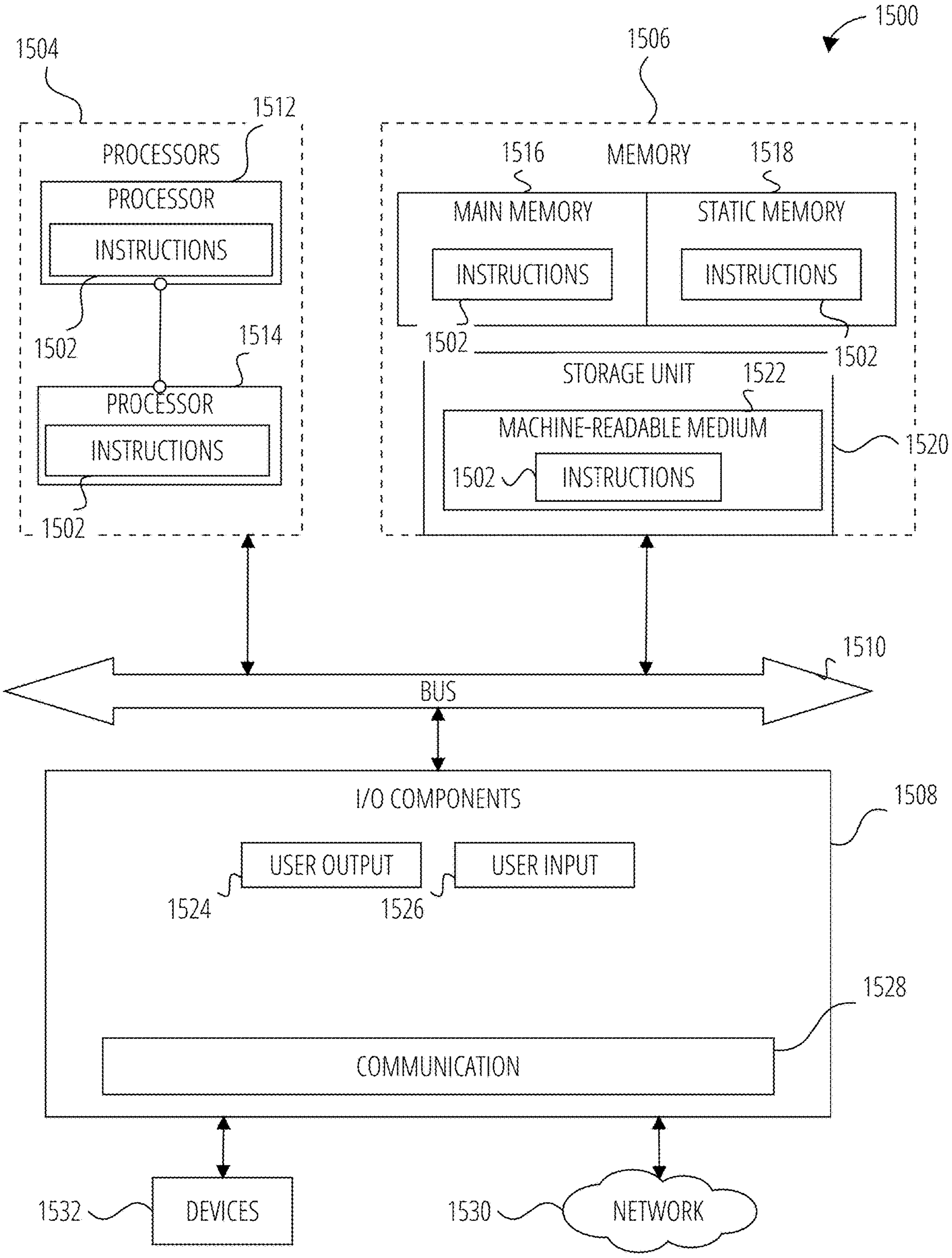
FIG. 15 is a diagrammatic representation of a machine in the form of a computer system within which a set of instructions may be executed to cause the machine to perform any one or more of the methodologies discussed herein, according to some examples.

FIG. 15 is a diagrammatic representation of the machine 1500 within which instructions 1502 (e.g., software, a program, an application, an applet, an app, or other executable code) for causing the machine 1500 to perform any one or more of the methodologies discussed herein may be executed. For example, the instructions 1502 may cause the machine 1500 to execute any one or more of the methods described herein. The instructions 1502 transform the general, non-programmed machine 1500 into a particular machine 1500 programmed to carry out the described and illustrated functions in the manner described. The machine 1500 may operate as a standalone device or may be coupled (e.g., networked) to other machines. In a networked deployment, the machine 1500 may operate in the capacity of a server machine or a client machine in a server-client network environment, or as a peer machine in a peer-to-peer (or distributed) network environment. The machine 1500 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch, a pair of augmented reality glasses), a smart home device (e.g., a smart appliance), other smart devices, a web appliance, a network router, a network switch, a network bridge, or any machine capable of executing the instructions 1502, sequentially or otherwise, that specify actions to be taken by the machine 1500. Further, while a single machine 1500 is illustrated, the term "machine" shall also be taken to include a collection of machines that individually or jointly execute the instructions 1502 to perform any one or more of the methodologies discussed herein. In some examples, the machine 1500 may comprise both client and server systems, with certain operations of a particular method or algorithm being performed on the server-side and with certain operations of the particular method or algorithm being performed on the client-side.

The machine 1500 may include processors 1504, memory 1506, and input/output I/O components 1508, which may be configured to communicate with each other via a bus 1510. In an example, the processors 1504 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1512 and a processor 1514 that execute the instructions 1502. The term "processor" is intended to include multi-core processors that may comprise two or more independent processors (sometimes referred to as "cores") that may execute instructions contemporaneously. Although FIG. 15 shows multiple processors 1504, the machine 1500 may include a single processor with a single-core, a single processor with multiple cores (e.g., a multi-core processor), multiple processors with a single core, multiple processors with multiples cores, or any combination thereof.

The memory 1506 includes a main memory 1516, a static memory 1518, and a storage unit 1520, both accessible to the processors 1504 via the bus 1510. The main memory 1506, the static memory 1518, and storage unit 1520 store the instructions 1502 embodying any one or more of the methodologies or functions described herein. The instructions 1502 may also reside, completely or partially, within the main memory 1516, within the static memory 1518, within machine-readable medium 1522 within the storage unit 1520, within at least one of the processors 1504 (e.g., within the processor's cache memory), or any suitable combination thereof, during execution thereof by the machine 1500.

The I/O components 1508 may include a wide variety of components to receive input, provide output, produce output, transmit information, exchange information, capture measurements, and so on. The specific I/O components 1508 that are included in a particular machine will depend on the type of machine. For example, portable machines such as mobile phones may include a touch input device or other such input mechanisms, while a headless server machine will likely not include such a touch input device. It will be appreciated that the I/O components 1508 may include many other components that are not shown in FIG. 15. In various examples, the I/O components 1508 may include user output components 1524 and user input components 1526. The user output components 1524 may include visual components (e.g., a display such as the display 806, a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1526 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

Communication may be implemented using a wide variety of technologies. The I/O components 1508 further include communication components 1528 operable to couple the machine 1500 to a network 1530 or devices 1532 via respective coupling or connections. For example, the communication components 1528 may include a network interface component or another suitable device to interface with the network 1530. In further examples, the communication components 1528 may include wired communication components, wireless communication components, cellular communication components, satellite communication, Near Field Communication (NFC) components, Bluetooth® components (e.g., Bluetooth® Low Energy), Wi-Fi® components, Zigbee, Ant+, and other communication components to provide communication via other modalities. The devices 1532 may be another machine or any of a wide variety of peripheral devices (e.g., a peripheral device coupled via a USB).

The various memories (e.g., main memory 1516, static memory 1518, and memory of the processors 1504) and storage unit 1520 may store one or more sets of instructions and data structures (e.g., software) embodying or used by any one or more of the methodologies or functions described herein. These instructions (e.g., the instructions 1502), when executed by processors 1504, cause various operations to implement the disclosed examples.

The instructions 1502 may be transmitted or received over the network 1530, using a transmission medium, via a network interface device (e.g., a network interface component included in the communication components 1528) and using any one of several well-known transfer protocols (e.g., hypertext transfer protocol (HTTP)). Similarly, the instructions 1502 may be transmitted or received using a transmission medium via a coupling (e.g., a peer-to-peer coupling) to the devices 1532.

CONCLUSION

As described above, examples described herein may address one or more technical problems associated with pulse width modulation of pixels. By providing a dither bit independent from the grayscale value encoded by the select bits of a binary encoding, the trailing edges of pulses may be dithered to maintain leading edges in synchrony across adjacent pixels, thereby potentially diminishing visual artifacts created by fringe-field effects. In addition, contour blending may be used in some examples to further reduce the residual artifacts from leading edge fringe-field differences while reducing the likelihood and/or degree of flickering. In some examples, full display illumination may be maintained by using a trailing edge dithering scheme that adds an additional possible time segment to pulses encoded within an illumination window in combination with contour blending at or near maximum grayscale values.

Example 1 is a method for controlling a pixel of a display using pulse width modulation (PWM), comprising: obtaining a desired grayscale value for the pixel; processing the desired grayscale value to generate a binary encoding, comprising: a plurality of select bits encoding a select value; and a dither bit encoding a dither value, the binary encoding being encoded according to a scheme in which: a first select value and a first dither value indicate a center-aligned pulse of a first width having a leading edge at a first temporal position; a second select value and the first dither value indicates a center-aligned pulse of a second width having a leading edge at a second temporal position; and the first select value and a second dither value indicate a center-aligned pulse of a second width having a leading edge at the first temporal position; and providing the binary encoding to the display for pulse width modulation of the pixel.

In Example 2, the subject matter of Example 1 includes, wherein: the plurality of select bits consists of n select bits; and the scheme is configured to encode 2n different pulse widths using the n select bits.

In Example 3, the subject matter of Examples 1-2 includes, wherein: the plurality of select bits consists of n select bits; and the scheme is configured to encode (2n−1) different pulse widths using the n select bits.

In Example 4, the subject matter of Examples 1-3 includes, wherein: the plurality of select bits consists of n select bits; and the scheme is configured to encode fewer than (2n−1) different pulse widths using the n select bits.

In Example 5, the subject matter of Examples 1-4 includes, wherein: during a current illumination window, a second pixel adjacent to the pixel is modulated by a second binary encoding encoding a pulse having a leading edge at a second pixel pulse temporal position; and the select value and the dither value of the binary encoding indicate a center-aligned pulse having a leading edge at the second pixel pulse temporal position.

In Example 6, the subject matter of Example 5 includes, wherein: the dither value of the binary encoding indicates the second pixel pulse temporal position.

In Example 7, the subject matter of Examples 1-6 includes, decoding, at the display, the binary encoding to generate a pulse having: a width; and a leading edge at a temporal position according to the scheme; and controlling the pixel using the pulse.

In Example 8, the subject matter of Examples 1-7 includes, wherein: the desired grayscale value is intended to apply to the pixel over a plurality of frames; and the scheme applies contour blending to the pixel by: generating a plurality of scaled grayscale values corresponding to the plurality of the frames, one or more of the scaled grayscale values being adjusted from the desired grayscale value by a respective scale adjustment such that an average of the plurality of scaled grayscale values is within one unit of grayscale value of the desired grayscale value; and generating a plurality of binary encodings corresponding to the plurality of scaled grayscale values.

In Example 9, the subject matter of Example 8 includes, wherein: the plurality of scaled grayscale values including one or more pairs of scaled grayscale values in which: one scaled grayscale value of the pair is above the desired grayscale value by a first amount; the other scaled grayscale value of the pair is below the desired grayscale value by the first amount; and each pair of the one or more pairs corresponds to a pair of adjacent frames of the plurality of frames.

In Example 10, the subject matter of Examples 8-9 includes, wherein: the plurality of scaled grayscale values, ordered by scaled grayscale value, each differ from the adjacent scaled grayscale values by at most one unit of grayscale value.

Example 11 is a system comprising: a display; and one or more processors configured to execute instructions that configure the system to control a pixel of the display using pulse width modulation (PWM) by performing operations comprising: obtaining a desired grayscale value for the pixel; processing the desired grayscale value to generate a binary encoding, comprising: a plurality of select bits encoding a select value; and a dither bit encoding a dither value, the binary encoding being encoded according to a scheme in which: a first select value and a first dither value indicate a center-aligned pulse of a first width having a leading edge at a first temporal position; a second select value and the first dither value indicates a center-aligned pulse of a second width having a leading edge at a second temporal position; and the first select value and a second dither value indicate a center-aligned pulse of a second width having a leading edge at the first temporal position; and providing the binary encoding to the display for pulse width modulation of the pixel.

In Example 12, the subject matter of Example 11 includes, wherein: the plurality of select bits consists of n select bits; and the scheme is configured to encode 2n different pulse widths using the n select bits.

In Example 13, the subject matter of Examples 11-12 includes, wherein: the plurality of select bits consists of n select bits; and the scheme is configured to encode (2n−1) different pulse widths using the n select bits.

In Example 14, the subject matter of Examples 11-13 includes, wherein: the plurality of select bits consists of n select bits; and the scheme is configured to encode fewer than (2n−1) different pulse widths using the n select bits.

In Example 15, the subject matter of Examples 11-14 includes, wherein: during a current illumination window, a second pixel adjacent to the pixel is modulated by a second binary encoding encoding a pulse having a leading edge at a second pixel pulse temporal position; and the select value and the dither value of the binary encoding indicate a center-aligned pulse having a leading edge at the second pixel pulse temporal position.

In Example 16, the subject matter of Example 15 includes, wherein: the dither value of the binary encoding indicates the second pixel pulse temporal position.

In Example 17, the subject matter of Examples 11-16 includes, wherein the operations further comprise: decoding, at the display, the binary encoding to generate a pulse having: a width; and a leading edge at a temporal position according to the scheme; and controlling the pixel using the pulse.

In Example 18, the subject matter of Examples 11-17 includes, wherein: the desired grayscale value is intended to apply to the pixel over a plurality of frames; and the scheme applies contour blending to the pixel by: generating a plurality of scaled grayscale values corresponding to the plurality of the frames, one or more of the scaled grayscale values being adjusted from the desired grayscale value by a respective scale adjustment such that an average of the plurality of scaled grayscale values is within one unit of grayscale value of the desired grayscale value; and generating a plurality of binary encodings corresponding to the plurality of scaled grayscale values.

In Example 19, the subject matter of Example 18 includes, wherein: the plurality of scaled grayscale values including one or more pairs of scaled grayscale values in which: one scaled grayscale value of the pair is above the desired grayscale value by a first amount; the other scaled grayscale value of the pair is below the desired grayscale value by the first amount; and each pair of the one or more pairs corresponds to a pair of adjacent frames of the plurality of frames.

Example 20 is a non-transitory computer-readable storage medium, the computer-readable storage medium including instructions that, when executed by one or more processors of a system, cause the system to control a pixel of a display using pulse width modulation (PWM) by performing operations comprising: obtaining a desired grayscale value for the pixel; processing the desired grayscale value to generate a binary encoding, comprising: a plurality of select bits encoding a select value; and a dither bit encoding a dither value, the binary encoding being encoded according to a scheme in which: a first select value and a first dither value indicate a center-aligned pulse of a first width having a leading edge at a first temporal position; a second select value and the first dither value indicates a center-aligned pulse of a second width having a leading edge at a second temporal position; and the first select value and a second dither value indicate a center-aligned pulse of a second width having a leading edge at the first temporal position; and providing the binary encoding to the display for pulse width modulation of the pixel.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

It will be appreciated that the various aspects of the methods described above may be combined in various combination or sub-combinations.

Glossary

"Component" refers, for example, to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Programming Interface (API)). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers, for example, to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Machine storage medium" refers, for example, to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; USB flash drives; and CD-ROM and DVD-ROM disks. The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers, for example, to a tangible medium that is capable of storing, encoding, or carrying the instructions for execution by a machine.

"Signal medium" refers, for example, to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method for controlling a pixel of a display using pulse width modulation (PWM), comprising:

obtaining a desired grayscale value for the pixel;

processing the desired grayscale value to generate a binary encoding, comprising:

a plurality of select bits encoding a select value; and a dither bit encoding a dither value, the binary encoding being encoded according to a scheme in which:

a first select value and a first dither value indicate a center-aligned pulse of a first width having a leading edge at a first temporal position;

a second select value and the first dither value indicates a center-aligned pulse of a second width having a leading edge at a second temporal position; and the first select value and a second dither value indicate a center-aligned pulse of a second width having a leading edge at the first temporal position; and providing the binary encoding to the display for pulse width modulation of the pixel.

2. The method of claim 1, wherein:

the plurality of select bits consists of n select bits; and the scheme is configured to encode $2^n$ different pulse widths using the n select bits.

3. The method of claim 1, wherein:

the plurality of select bits consists of n select bits; and the scheme is configured to encode $(2^n-1)$ different pulse widths using the n select bits.

4. The method of claim 1, wherein:

the plurality of select bits consists of n select bits; and the scheme is configured to encode fewer than $(2^n-1)$ different pulse widths using the n select bits.

5. The method of claim 1, wherein:

during a current illumination window, a second pixel adjacent to the pixel is modulated by a second binary encoding encoding a pulse having a leading edge at a second pixel pulse temporal position; and the select value and the dither value of the binary encoding indicate a center-aligned pulse having a leading edge at the second pixel pulse temporal position.

6. The method of claim 5, wherein:

the dither value of the binary encoding indicates the second pixel pulse temporal position.

7. The method of claim 1, further comprising:

decoding, at the display, the binary encoding to generate a pulse having:

a width; and a leading edge at a temporal position according to the scheme; and controlling the pixel using the pulse.

8. The method of claim 1, wherein:

the desired grayscale value is intended to apply to the pixel over a plurality of frames; and the scheme applies contour blending to the pixel by:

generating a plurality of scaled grayscale values corresponding to the plurality of the frames, one or more of the scaled grayscale values being adjusted from the desired grayscale value by a respective scale adjustment such that an average of the plurality of scaled grayscale values is within one unit of grayscale value of the desired grayscale value; and generating a plurality of binary encodings corresponding to the plurality of scaled grayscale values.

9. The method of claim 8, wherein:

the plurality of scaled grayscale values including one or more pairs of scaled grayscale values in which:

one scaled grayscale value of the pair is above the desired grayscale value by a first amount;

the other scaled grayscale value of the pair is below the desired grayscale value by the first amount; and each pair of the one or more pairs corresponds to a pair of adjacent frames of the plurality of frames.

10. The method of claim 8, wherein:

the plurality of scaled grayscale values, ordered by scaled grayscale value, each differ from the adjacent scaled grayscale values by at most one unit of grayscale value.

11. A system comprising:

a display; and one or more processors configured to execute instructions that configure the system to control a pixel of the display using pulse width modulation (PWM) by performing operations comprising:

obtaining a desired grayscale value for the pixel;

processing the desired grayscale value to generate a binary encoding, comprising:

a plurality of select bits encoding a select value; and a dither bit encoding a dither value, the binary encoding being encoded according to a scheme in which:

a first select value and a first dither value indicate a center-aligned pulse of a first width having a leading edge at a first temporal position;

a second select value and the first dither value indicates a center-aligned pulse of a second width having a leading edge at a second temporal position; and the first select value and a second dither value indicate a center-aligned pulse of a second width having a leading edge at the first temporal position; and providing the binary encoding to the display for pulse width modulation of the pixel.

12. The system of claim 11, wherein:

the plurality of select bits consists of n select bits; and the scheme is configured to encode $2^n$ different pulse widths using the n select bits.

13. The system of claim 11, wherein:

the plurality of select bits consists of n select bits; and the scheme is configured to encode $(2^n-1)$ different pulse widths using the n select bits.

14. The system of claim 11, wherein:

the plurality of select bits consists of n select bits; and the scheme is configured to encode fewer than $(2^n-1)$ different pulse widths using the n select bits.

15. The system of claim 11, wherein:

during a current illumination window, a second pixel adjacent to the pixel is modulated by a second binary encoding encoding a pulse having a leading edge at a second pixel pulse temporal position; and the select value and the dither value of the binary encoding indicate a center-aligned pulse having a leading edge at the second pixel pulse temporal position.

16. The system of claim 15, wherein:

the dither value of the binary encoding indicates the second pixel pulse temporal position.

17. The system of claim 11, wherein the operations further comprise:

decoding, at the display, the binary encoding to generate a pulse having:

a width; and a leading edge at a temporal position according to the scheme; and controlling the pixel using the pulse.

18. The system of claim 11, wherein:

the desired grayscale value is intended to apply to the pixel over a plurality of frames; and the scheme applies contour blending to the pixel by:

generating a plurality of scaled grayscale values corresponding to the plurality of the frames, one or more of the scaled grayscale values being adjusted from the desired grayscale value by a respective scale adjustment such that an average of the plurality of scaled grayscale values is within one unit of grayscale value of the desired grayscale value; and generating a plurality of binary encodings corresponding to the plurality of scaled grayscale values.

19. The system of claim 18, wherein:

the plurality of scaled grayscale values including one or more pairs of scaled grayscale values in which:

one scaled grayscale value of the pair is above the desired grayscale value by a first amount;

the other scaled grayscale value of the pair is below the desired grayscale value by the first amount; and each pair of the one or more pairs corresponds to a pair of adjacent frames of the plurality of frames.

20. A non-transitory computer-readable storage medium, the computer-readable storage medium including instructions that, when executed by one or more processors of a system, cause the system to control a pixel of a display using pulse width modulation (PWM) by performing operations comprising:

obtaining a desired grayscale value for the pixel;

processing the desired grayscale value to generate a binary encoding, comprising:

a plurality of select bits encoding a select value; and a dither bit encoding a dither value, the binary encoding being encoded according to a scheme in which:

a first select value and a first dither value indicate a center-aligned pulse of a first width having a leading edge at a first temporal position;

a second select value and the first dither value indicates a center-aligned pulse of a second width having a leading edge at a second temporal position; and the first select value and a second dither value indicate a center-aligned pulse of a second width having a leading edge at the first temporal position; and providing the binary encoding to the display for pulse width modulation of the pixel.

* * * * *